(12) United States Patent
Kishi et al.

(10) Patent No.: US 10,306,149 B2
(45) Date of Patent: May 28, 2019

(54) IMAGE PROCESSING APPARATUS, ROBOT SYSTEM, ROBOT, AND IMAGE PROCESSING METHOD

(71) Applicant: Seiko Epson Corporation, Tokyo (JP)

(72) Inventors: Yoshiyuki Kishi, Azumino (JP); Seiji Aiso, Shiojiri (JP)

(73) Assignee: Seiko Epson Corporation (JP)

( * ) Notice: Subject to any disclaimer, the term of this patent is extended or adjusted under 35 U.S.C. 154(b) by 243 days.

(21) Appl. No.: 15/348,236

(22) Filed: Nov. 10, 2016

(65) Prior Publication Data

US 2017/0142340 A1 May 18, 2017

(30) Foreign Application Priority Data

Nov. 12, 2015 (JP) ................................ 2015-221880
Nov. 12, 2015 (JP) ................................ 2015-221881

(51) Int. Cl.
*H04N 5/232* (2006.01)
*G06K 9/00* (2006.01)
(Continued)

(52) U.S. Cl.
CPC ..... *H04N 5/23293* (2013.01); *G06K 9/00664* (2013.01); *G06T 1/0014* (2013.01); *G06T 11/60* (2013.01); *H04N 5/23212* (2013.01); *B25J 19/023* (2013.01); *G06F 3/0482* (2013.01); *G06F 3/04847* (2013.01); *G06K 9/4604* (2013.01); *G06K 9/4671* (2013.01); *G06K 2009/4666* (2013.01); *Y10S 901/44* (2013.01); *Y10S 901/47* (2013.01)

(58) Field of Classification Search
CPC combination set(s) only.
See application file for complete search history.

(56) References Cited

U.S. PATENT DOCUMENTS 5,940,296 A 8/1999 Meyer
8,035,726 B2 10/2011 Matsumoto et al.
(Continued)

FOREIGN PATENT DOCUMENTS

JP 07-028970 A 1/1995
JP 08-251344 A 9/1996
(Continued)

OTHER PUBLICATIONS

D. Koelma et al., "A visual programming interface for an image processing environment", Pattern Recognition Letters, vol. 15, pp. 1099-1109 (1994).
(Continued)

*Primary Examiner* — Janese Duley
(74) *Attorney, Agent, or Firm* — Harness, Dickey & Pierce, P.L.C.

(57) ABSTRACT

An image processing apparatus that performs inspection or measurement of an object included in an image, the image processing apparatus receiving operation from a user, selecting second image processing information, which is information indicating second image processing configured by a plurality of kinds of first image processing, on the basis of the received operation, and performing editing of the plurality of kinds of first image processing configuring the second image processing indicated by the second image processing information.

12 Claims, 21 Drawing Sheets

(51) Int. Cl.
*G06T 1/00* (2006.01)
*G06T 11/60* (2006.01)
*B25J 19/02* (2006.01)
*G06F 3/0482* (2013.01)
*G06F 3/0484* (2013.01)
*G06K 9/46* (2006.01)

(56) References Cited

U.S. PATENT DOCUMENTS

| | | |
|---|---|---|
| 2006/0188170 A1* | 8/2006 | Kanda .................... G06K 9/033 |
| | | 382/255 |
| 2011/0050914 A1 | 3/2011 | Kiuchi |
| 2011/0072349 A1* | 3/2011 | Catanese ................ H04N 5/445 |
| | | 715/719 |
| 2013/0195345 A1 | 8/2013 | Nammoto et al. |

FOREIGN PATENT DOCUMENTS

| | | |
|---|---|---|
| JP | 11-004378 A | 1/1999 |
| JP | 2000-125179 A | 4/2000 |
| JP | 2008-276115 A | 11/2008 |
| JP | 2011-049980 A | 3/2011 |

OTHER PUBLICATIONS

Extended European Search Report for Patent Application No. EP 16198147.7 dated Apr. 26, 2017 (6 pages).

* cited by examiner

IMAGE PROCESSING APPARATUS, ROBOT SYSTEM, ROBOT, AND IMAGE PROCESSING METHOD

BACKGROUND

1. Technical Field

The present invention relates to an image processing apparatus, a robot system, a robot, and an image processing method.

2. Related Art

Researches and developments of image processing for performing inspection and measurement of objects included in a picked-up image have been performed.

Concerning the image processing, there is known a method of selecting, in sequentially registering image processing commands and creating an image processing procedure, according to a type of an immediately preceding registered image processing command, an image processing command for displaying candidates of an image processing command that should be registered as the next procedure (see JP-A-07-28970 (Patent Literature 1)).

An image pickup apparatus (a camera) includes one or more lenses for focusing on a target object. There is an image pickup apparatus including a part (a focus ring) with which a user (a person) is capable of manually performing adjustment of focusing. For example, the user manually adjusts the focus ring of the image pickup apparatus while viewing a video (a live video) currently being picked up by the image pickup apparatus.

However, in such adjustment by the visual sense of the user, it is sometimes difficult to accurately adjust the focusing. For example, work for adjusting details of an image while viewing the details is sometimes difficult. Further, when focusing on a target object having depth, the user needs to adjust a diaphragm of the lenses together with the focus ring.

In order to assist the manual adjustment of the user, there is an image processing apparatus that displays an index value (a focus index value) representing a degree of the focusing. As the focus index value, for example, a statistical value of a luminance difference is used.

As an example, an image processing apparatus described in JP-A-2011-49980 (Patent Literature 2) calculates a focus value using an average of concentration values of colors of pixels included in an input image and a square average of the concentration values of the colors of the pixels included in the input image and outputs the calculated focus value (see paragraphs 0109 and 0110 of Patent Literature 2).

However, in the selection method described in Patent Literature 1, the candidates are displayed according to the immediately preceding registered image processing command. Therefore, even if the creation of the image processing procedure can be assisted, the user himself or herself has to select an image processing command necessary for performing desired inspection and measurement. Therefore, in an image processing apparatus having the selection method, it is sometimes difficult for the user to perform desired image processing unless the user has expert knowledge concerning image processing.

In Patent Literature 2, the focus value used in the past is a relative index. Accuracy of the focusing is sometimes insufficient. For example, since a luminance distribution changes according to contents of an image, elements unrelated to the focusing such as relatively bright or dark reflection of a target object affect each of images. Therefore, accuracy of focusing of the image is sometimes insufficient. When only a region of interest of a target object of image processing is focused (a part of a picked-up image is focused), accuracy is sometimes insufficient. The same applies to a robot or a robot system including the image processing apparatus.

SUMMARY

An advantage of some aspects of the invention is to solve at least a part of the problems described above, and the invention can be implemented as the following forms or aspects.

First Aspect

A first aspect of the invention is directed to an image processing apparatus that performs inspection or measurement of an object included in an image, the image processing apparatus receiving operation from a user, selecting second image processing information, which is information indicating second image processing configured by a plurality of kinds of first image processing, on the basis of the received operation, and performing editing of the plurality of kinds of first image processing configuring the second image processing indicated by the second image processing information.

With this configuration, the image processing apparatus receives operation from a user, selects second image processing information, which is information indicating second image processing configured by a plurality of kinds of first image processing, on the basis of the received operation, and performs editing of the plurality of kinds of first image processing configuring the second image processing indicated by the second image processing information. Consequently, the image processing apparatus can easily perform image processing desired by the user.

Second Aspect

As a second aspect of the invention, the image processing apparatus may be configured such that the image processing apparatus causes a display section to display a plurality of kinds of the second image processing information and is capable of selecting the second image processing information from the displayed plurality of kinds of second image processing information.

With this configuration, the image processing apparatus causes the display section to display a plurality of kinds of the second image processing information and is capable of selecting the second image processing information from the displayed plurality of kinds of second image processing information. Consequently, the image processing apparatus can easily perform image processing desired by the user on the basis of the selected second image processing information.

Third Aspect

As a third aspect of the invention, the image processing apparatus may be configured to perform, on the basis of operation received from the user, as the editing, addition or deletion of first image processing information indicating the first image processing configuring the second image processing indicated by the second image processing information.

With this configuration, the image processing apparatus performs, on the basis of operation received from the user, as the editing of the plurality of kinds of first image processing configuring the second image processing indicated by the second image processing information, addition or deletion of first image processing information indicating the first image processing configuring the second image processing indicated by the second image processing information. Consequently, the image processing apparatus can change the second image processing to image processing desired by the user.

Fourth Aspect

As a fourth aspect of the invention, the image processing apparatus may be configured such that the user is capable of inputting parameters used in execution of the first image processing indicated by the first image processing information.

With this configuration, in the image processing apparatus, the user is capable of inputting parameters used in execution of the first image processing indicated by the first image processing information. Consequently, the image processing apparatus can easily perform image processing desired by the user on the basis of the input parameters.

Fifth Aspect

As a fifth aspect of the invention, the image processing apparatus may be configured to select two or more kinds of the first image processing information on the basis of operation received from the user and generate the second image processing information on the basis of the selected first image processing information.

With this configuration, the image processing apparatus selects two or more kinds of the first image processing information on the basis of operation received from the user and generates the second image processing information on the basis of the selected first image processing information. Consequently, the image processing apparatus can easily perform image processing desired by the user on the basis of the generated second image processing information.

Sixth Aspect

A sixth aspect of the invention is directed to a robot system including: the image processing apparatus according to any one of the aspects; and a robot configured to perform predetermined work on the basis of a result of image processing by the image processing apparatus.

With this configuration, the robot system receives operation from a user, selects second image processing information, which is information indicating second image processing configured by a plurality of kinds of first image processing, on the basis of the received operation, and performs editing of the plurality of kinds of first image processing configuring the second image processing indicated by the second image processing information. Consequently, the robot system can easily perform image processing desired by the user.

Seventh Aspect

A seventh aspect of the invention is directed to a robot including the image processing apparatus according to any one of the aspects.

With this configuration, the robot receives operation from a user, selects second image processing information, which is information indicating second image processing configured by a plurality of kinds of first image processing, on the basis of the received operation, and performs editing of the plurality of kinds of first image processing configuring the second image processing indicated by the second image processing information. Consequently, the robot can easily perform image processing desired by the user.

Eighth Aspect

An eighth aspect of the invention is directed to an image processing method for performing inspection or measurement of an object included in an image, the image processing method including: receiving operation from a user; selecting second image processing information, which is information indicating second image processing configured by a plurality of kinds of first image processing, on the basis of a first kind of the operation received in the receiving operation; and performing, on the basis of a second kind of the operation received in the receiving operation, editing of the plurality of kinds of first image processing configuring the second image processing indicated by the second image processing information.

With this configuration, in the image processing method, operation from a user is received, second image processing information, which is information indicating second image processing configured by a plurality of kinds of first image processing, is selected on the basis of the received operation, and editing of the plurality of kinds of first image processing configuring the second image processing indicated by the second image processing information is performed. Consequently, in the image processing method, it is possible to easily perform image processing desired by the user.

As explained above, the image processing apparatus, the robot system, the robot, and the image processing method according to the first to eighth aspects receive operation from a user, select second image processing information, which is information indicating second image processing configured by a plurality of kinds of first image processing, on the basis of the received operation, and perform editing of the plurality of kinds of first image processing configuring the second image processing indicated by the second image processing information. Consequently, the image processing apparatus, the robot system, the robot, and the image processing method can easily perform image processing desired by the user.

Ninth Aspect

A ninth aspect of the invention is directed to an image processing apparatus that changes a position of a lens included in an image pickup apparatus and thereafter displays first information for determining whether apart of or an entire image picked up by the image pickup apparatus is focused and second information concerning focusing in the position of the lens.

With this configuration, the image processing apparatus displays first information for determining whether a part of or an entire picked-up image is focused and second information concerning focusing in the position of the lens. Consequently, the image processing apparatus can present, concerning a part of or an entire image picked up for inspection, measurement, or the like, accuracy of focusing of the image. For example, although it is difficult to automatically perform fine adjustment, it is possible to improve accuracy of focusing through manual adjustment by a user.

Tenth Aspect

A tenth aspect of the invention is directed to the image processing apparatus according to the ninth aspect, which includes a designating section configured to designate a part of the image.

With this configuration, the image processing apparatus designates a part of the image. Consequently, the image processing apparatus can present, concerning a part of an image designated when being desired to be set as a target of inspection, measurement, or the like, accuracy of focusing of the image.

Eleventh Aspect

An eleventh aspect of the invention is directed to the image processing apparatus according to the tenth aspect, in which the part of the image is a unit of a region of interest or a unit of a pixel.

With this configuration, the image processing apparatus displays, in a unit of a region of interest or a unit of a pixel, information concerning a first index value and information concerning a second index value. Consequently, the image processing apparatus can present, in the unit of the region of interest or the unit of the pixel, accuracy of focusing of an image (an image portion) of only the region of interest or the pixel desired to be set as a target of inspection, measurement, or the like.

Twelfth Aspect

A twelfth aspect of the invention is directed to the image processing apparatus according to any one of the ninth to eleventh aspects, in which the first information and the second information are index values.

With this configuration, in the image processing apparatus, the first information and the second information are index values. Consequently, the image processing apparatus can present accuracy of the focusing of the image using the index values.

Thirteenth Aspect

A thirteenth aspect of the invention is directed to the image processing apparatus according to the twelfth aspect, in which the first information is the index value representing a highest degree of focusing.

With this configuration, the image processing apparatus displays the first information, which is the index value representing a highest degree of focusing, and the second information. Consequently, the image processing apparatus can present the index value representing a highest degree of focusing.

Fourteenth Aspect

A fourteenth aspect of the invention is directed to the image processing apparatus according to the twelfth or fifteenth aspect, which includes a focusing display section configured to display, concerning a part of the image, one or both of presence and absence of focusing on the basis of the index values.

With this configuration, the image processing apparatus displays, concerning apart of the image, one or both of presence and absence of focusing. Consequently, the image processing apparatus can present, concerning a part of the image, one or both of presence and absence of focusing (focused and unfocused).

Fifteenth Aspect

A fifteenth aspect of the invention is directed to the image processing apparatus according to any one of the twelfth to fourteenth aspects, which includes a tilt determining section configured to, when there are a plurality of the parts of the image and all of the plurality of parts of the image are focused, determine that there is no tilt concerning a target object specified by a part of the plurality of images and on the other hand, when one or more of the plurality of parts of the image are not focused, determine that there is a tilt concerning the target object.

With this configuration, when there are a plurality of the parts of the image and all of the plurality of parts of the image are focused, the image processing apparatus determines that there is no tilt concerning a target object specified by a part of the plurality of images. On the other hand, when one or more of the plurality of parts of the image are not focused, the image processing apparatus determines that there is a tilt concerning the target object. Consequently, the image processing apparatus can present presence and absence of a tilt concerning the target object. For example, it is possible to adjust the tilt according to, for example, manual adjustment of the user.

Sixteenth Aspect

A sixteenth aspect of the invention is directed to the image processing apparatus according to any one of the twelfth to fifteenth aspects, which includes an index-value calculating section configured to extract a contour of an object using the image and calculate the index value.

With this configuration, the image processing apparatus extracts a contour of an object and calculates the index value. Consequently, the image processing apparatus can present accuracy of focusing of the image using the index value concerning the contour of the object.

Seventeenth Aspect

A seventeenth aspect of the invention is directed to the image processing apparatus according to the sixteenth aspect, in which the index value is a value based on length in a gradient direction of luminance of the contour.

With this configuration, in the image processing apparatus, the index value is a value based on length in a gradient direction of luminance of the contour. Consequently, the image processing apparatus can present accuracy of focusing of the image using the index value based on the length in the gradient direction of the luminance of the contour.

Eighteenth Aspect

An eighteenth aspect of the invention is directed to the image processing apparatus according to the sixteenth aspect, in which the index value is a value based on width of an edge of luminance of the contour.

With this configuration, in the image processing apparatus, the index value is a value based on width of an edge of luminance of the contour. Consequently, the image processing apparatus can present accuracy of focusing of the image using the index value based on the width of the edge of the luminance of the contour.

Nineteenth Aspect

A nineteenth aspect of the invention is directed to the image processing apparatus according to the sixteenth aspect, in which the index value is a value based on edge width of a connected plurality of very small luminance gradients of the contour.

With this configuration, in the image processing apparatus, the index value is a value based on edge width of a connected plurality of very small luminance gradients of the contour. Consequently, the image processing apparatus can present accuracy of focusing of the image using the index value based on the edge width of the connected plurality of very small luminance gradients of the contour.

Twentieth Aspect

A twentieth aspect of the invention is directed to a robot including the image processing apparatus according to any one of the ninth to nineteenth aspects.

With this configuration, in the robot, the image processing apparatus displays information concerning a first index value and information concerning a second index value as index values capable of independently determining whether apart of or an entire picked-up image is focused. Consequently, the robot can present accuracy of focusing of the image. For example, it is possible to improve the accuracy of the focusing through manual adjustment by a user.

Twenty-First Aspect

A twenty-first aspect of the invention is directed to a robot system including: the image processing apparatus according to any one of the ninth to nineteenth aspects; the image pickup apparatus configured to pick up the image; and a robot.

With this configuration, in the robot system, the image processing apparatus displays information concerning a first index value and information concerning a second index value as index values capable of independently determining whether a part of or an entire picked-up image is focused. Consequently, the robot system can present accuracy of focusing of the image. For example, it is possible to improve the accuracy of the focusing through manual adjustment by a user.

As explained above, the image processing apparatus, the robot, and the robot system according to the ninth to twenty-first aspects of the invention display the first information for determining whether a part of or an entire picked-up image is focused and second information concerning focusing in the position of the lens. Consequently, the image processing apparatus, the robot, and the robot system according to the invention can present, concerning a part of or an entire image picked up for inspection, measurement, or the like, accuracy of focusing of the image. For example, it is possible to improve accuracy of focusing through manual adjustment by the user.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the drawings.

First Embodiment

Configuration of an Image Processing System

Figure 1:
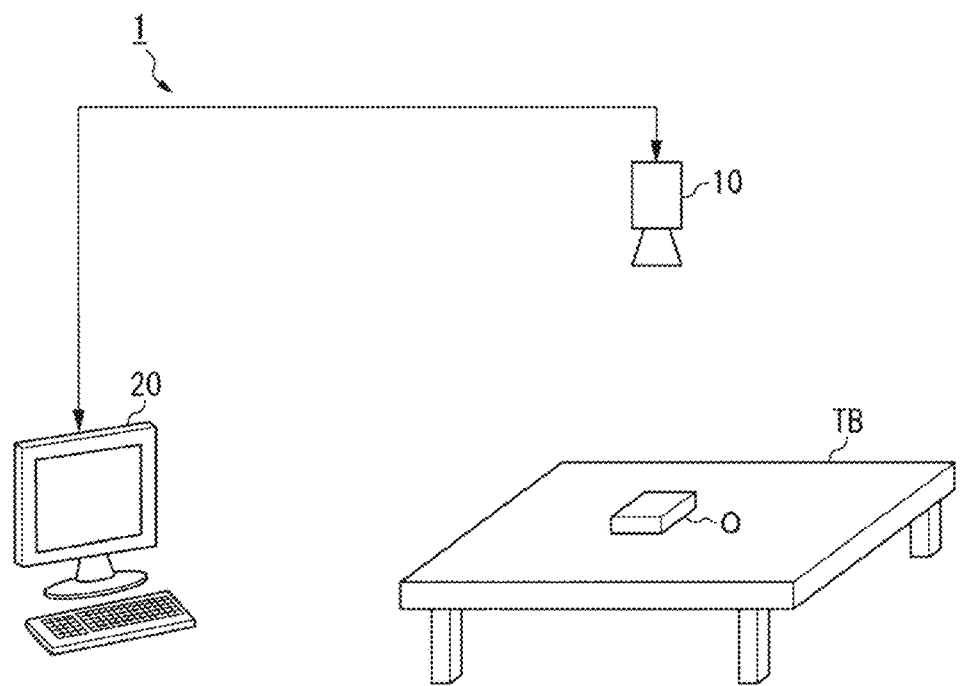
FIG. 1 is a configuration diagram showing an example of an image processing system according to a first embodiment.

First, the configuration of an image processing system 1 is explained. FIG. 1 is a configuration diagram showing an example of the image processing system 1 according to this embodiment. The image processing system 1 includes an image pickup section 10 and an image processing apparatus 20.

The image pickup section 10 is a camera including, for example, a CCD (Charge Coupled Device) or a CMOS (Complementary Metal Oxide Semiconductor), which is an image pickup device that converts collected light into an electric signal. In this example, the image pickup section 10 is set in a position where the image pickup section 10 is capable of picking up an image of a range including a target object O.

The target object O is an industrial component or member such as a plate, a gear, a screw, or a bolt assembled to a product. In FIG. 1, for simplification of the figure, the target object O is represented as an object having a rectangular parallelepiped shape. Note that the object O may be anther object such as an article for daily use or an organism instead of the industrial component or member. The shape of the target object O may be another shape instead of the rectangular parallelepiped shape.

In this example, the target object O is placed on the upper surface of a workbench TB. The workbench TB is, for example, a table. Note that the workbench TB may be another object such as a floor surface of a shelf instead of the table. In the example shown in FIG. 1, only one target object O is placed on the upper surface of the workbench TB. However, instead, two or more target objects O may be placed on the upper surface of the workbench TB.

The image pickup section 10 is communicably connected to the image processing apparatus 20 by a cable. Wired communication via the cable is performed according to a standard such as an Ethernet (registered trademark) or a USB. Note that the image pickup section 10 may be connected to the image processing apparatus 20 by wireless communication performed according to a communication standard such as Wi-Fi (registered trademark).

The image processing apparatus 20 performs inspection or measurement of an object included in an image. The measurement includes calculation of a position and a posture in a three-dimensional coordinate system of the object. The three-dimensional coordinate system is, for example, a world coordinate system, a robot coordinate system, or another local coordinate system. The image processing apparatus 20 is, for example, a workstation, a desktop PC (Personal Computer), a notebook PC, a tablet PC, a multifunction mobile phone terminal (smartphone), an electronic book reader with a communication function, or a PDA (Personal Digital Assistant).

Overview of Processing Performed by the Image Processing Apparatus

An overview of processing performed by the image processing apparatus 20 is explained below.

In this example, the image processing apparatus 20 causes the image pickup section 10 to pick up an image with a range including the target object O set as an image pickup range. The image processing apparatus 20 acquires the picked-up image picked up by the image pickup section 10. The image processing apparatus 20 performs, on the basis of the acquired picked-up image, inspection or measurement of the target object O included in the picked-up image.

Specifically, the image processing apparatus 20 receives operation from a user, executes a plurality of kinds of first image processing on the basis of the received operation, and performs image processing desired by the user. A part or all of the plurality of kinds of first image processing may be different from one another in processing performed on an image or may be the same in the processing.

In executing the plurality of kinds of first image processing, the image processing apparatus 20 receives operation from the user, selects, on the basis of the received operation, second image processing information, which is information indicating second image processing configured by the plurality of kinds of first image processing, and executes a plurality of kinds of first image processing configuring second image processing indicated by the selected second image processing information. The image processing apparatus 20 receives operation from the user and performs, on the basis of the received operation, editing of the plurality of kinds of first image processing configuring the second image processing indicated by the second image processing information. Consequently, the image processing apparatus 20 can easily perform image processing desired by the user.

For example, when second image processing is configured by a plurality of kinds of first image processing executed in image processing performed in the past, the user can execute, by selecting second image processing information indicating the second image processing, image processing for performing processing same as the image processing performed in the past. When the second image processing information is an image, a character string, or the like representing the image processing performed in the past, the user can select, on the basis of the image, the character string, or the like, second image processing information indicating desired image processing out of a plurality of kinds of second image processing information. Consequently, the image processing apparatus 20 can easily perform image processing desired by the user.

In the following explanation, as an example of the first image processing, the first image processing is assumed to be a tool used by the user to perform desired image processing. The first image processing is referred to as tool. The first image processing information is referred to as tool information. In this example, the tool information is a button including characters or an image representing the tool. The button is an icon that can be selected and operated (depressed, clicked, and tapped) on various screens displayed by the image processing apparatus 20.

In the following explanation, as an example of the second image processing, the second image processing is assumed to be a model (a template) of image processing performed by a plurality of tools. The second image processing is referred to as instance. The second image processing information is referred to as instance information. In this example, the instance information is a button including characters and an image representing the instance.

Specific Example of the Tool

In this example, the tool includes seven kinds of image processing described in 1A) to 7A) below.

1A) Geometric search processing (geometric search)
2A) Straight line detection processing
3A) Inter-straight-line distance calculation processing
4A) Color inspection processing
5A) Inter-two-point distance calculation processing
6A) Two-straight-line crossing point detection processing
7A) Prior processing (pre-processing)
8A) Simple operation processing Note that the tool may include other kinds of image processing instead of a part or all of 1A) to 8A) described above. The tool may include other kinds of image processing in addition to all of 1A) to 8A).

The geometric search processing is processing for detecting, from an image, geometric characteristics of a contour of an object designated by the user. In the geometric search processing, the image processing apparatus 20 specifies, on the basis of parameters input in advance from the user, a shape designated by the user. In this example, the parameters are information input from the user for each of tools on a screen displayed by the image processing apparatus 20. After being input from the user for each of the tools on the screen, the parameters are associated with the tools. For example, parameters input from the user for the geometric search processing on the screen displayed by the image processing apparatus 20 are associated with the geometric search processing.

The straight line detection processing is processing for detecting, from an image, a straight line included in a region designated by the user. In the straight line detection processing, the image processing apparatus 20 specifies, on the basis of parameters input in advance from the user, a straight line to be detected.

The inter-straight-line distance calculation processing is processing for performing the straight line detection processing in two places on the basis of parameters input in advance from the user and calculating a distance between detected two straight lines. In the inter-straight-line distance calculation processing, the image processing apparatus 20 specifies each of the two straight lines on the basis of parameters input in advance from the user.

The color inspection processing is processing for determining whether a color of a surface of the object detected by geometric search processing, the inside of the contour detected by the geometric search processing, or the like is a color designated by the user. In the color inspection processing, the image processing apparatus 20 specifies, on the basis of parameters input in advance from the user, the color designated by the user.

The inter-two-point distance calculation processing is processing for calculating a distance between two points designated by the user. In the inter-two-point distance calculation processing, the image processing apparatus 20 specifies, on the basis of parameters input in advance from the user, each of the two points designated by the user. The two points are, for example, a point indicating the center of gravity of the object detected by the geometric search processing and one endpoint of two endpoints detected by the geometric search processing.

The two-straight-line crossing point detection processing is processing for detecting a position of a crossing point of two straight lines designated by the user. In the two-straight-line crossing point detection processing, the image processing apparatus 20 specifies, on the basis of parameters input in advance from the user, the two straight lines designated by the user.

The prior processing is processing for performing filter processing designated by the user on an image before the kinds of processing of 1A) to 6A) described above are performed. In the prior processing, the image processing apparatus 20 specifies, on the basis of parameters input in advance from the user, the filter processing designated by the user. The filter processing designated by the user includes, for example, binarization filter processing of the image, smoothing filter processing of the image, sharpening filter processing, and median filter processing.

The simple operation processing is processing for performing an arithmetic operation (e.g., four arithmetic operations or an arithmetic operation performed using an elementary function) designated by the user. In the simple operation processing, the image processing apparatus 20 specifies, on the basis of parameters input in advance from the user, the arithmetic operation designated by the user.

Note that results of execution of other tools are sometimes input as the parameters explained above. Specifically, when a plurality of tools are executed in order one by one, a value output as an execution result of a tool executed before a certain tool is sometimes input as one of parameters associated with the tool. For example, when processing for calculating a distance between two objects is performed according to a combination of two kinds of geometric search processing and the inter-two-point distance calculation processing, a distance between two points calculated by the inter-two-point distance calculation processing is a distance between two points detected by each of the two kinds of geometric search processing. That is, in this case, the positions of the respective two points detected by each of the two kinds of geometric search processing are input as parameters associated with the inter-two-point distance calculation processing. In this way, in the image processing apparatus 20, processing results of other tools and a dependency relation among tools are sometimes reflected on parameters of a certain tool. In the following explanation, for convenience of explanation, processing results of other tools and a dependency relation among tools being reflected on parameters of a certain tool is referred to as dependency relationship of parameters.

Specific Examples of Instances

In this example, instances include four kinds of image processing of 1B) to 4B) described below.

1B) Gap measurement processing
2B) Object color inspection processing
3B) Inter-two object distance calculation processing
4B) Square center detection processing Note that the instances may include other kinds of image processing instead of apart or all of 1B) to 4B) described above. The instances may include other kinds of image processing in addition to all of 1B) to 4B).

As explained above, the instance is configured by a plurality of tools. The gap measurement processing is configured by a combination of the geometric search processing, the prior processing, the two kinds of straight line detection processing, and the inter-straight-line distance calculation processing among the tools. Specifically, in the gap measurement processing, the prior processing is performed on an image, a position of a measurement target is detected by the geometric search processing from the image on which the prior processing is performed, two straight line search regions of the inter-straight-line distance detection processing are corrected according to the detected position, two straight lines are detected from the image on which the prior processing is performed, and a distance between the detected two straight lines is calculated by the inter-straight-line distance calculation processing. Consequently, in the gap measurement processing, a gap between two objects included in the image is calculated (measured).

The object color inspection processing is configured by a combination of the geometric search processing and the color inspection processing among the tools. Specifically, in the object color inspection processing, an object designated by the user is detected by the geometric search processing from an image. It is determined by the color inspection processing whether a color of the detected object is a color designated by the user. Consequently, in the object color inspection processing, it is determined whether the color of the object included in the image is the color designated by the user.

The inter-two object distance calculation processing is configured by a combination of the geometric search processing and the inter-two-point distance calculation processing among the tools. Specifically, in the inter-two object distance calculation processing, a point indicating the center of gravity of a first object, which is a first object designated by the user, is detected from an image by first geometric search processing, a point indicating the center of gravity of a second object, which is a second object designated by the user, is detected from the image by second geometric search processing, and a distance between the point indicating the center of gravity of the first object and the point indicating the center of gravity of the second object is calculated by the inter-two-point distance calculation processing. Consequently, in the inter-two object distance calculation processing, a distance between the first object and the second object included in the image is calculated.

The square center detection processing is configured by a combination of the two-straight-line crossing point detection processing and the simple operation processing among the tools. Specifically, in the square center detection processing, a crossing point of a first straight line and a second straight line is detected from an image by first two-straight-line crossing point detection processing, a crossing point of the first straight line and a third straight line is detected from the image by second two-straight-line crossing point detection processing, a crossing point of the second straight line and a fourth straight line is detected from the image by third two-straight-line crossing point detection processing, and a crossing point of the third straight line and the fourth straight line is detected from the image by fourth two-straight-line crossing point detection processing. In the square center detection processing, a center (e.g., a figure center) of a square having the detected four crossing points respectively as vertexes is calculated by the simple operation processing.

Note that, in the image processing apparatus 20, in a part or all of the instances, the dependency relationship of the parameters explained above may be registered in advance without being input by the user, may be input by the user in advance, or may be input by the user later without being registered in advance.

Hardware Configuration of the Image Processing Apparatus

Figure 2:
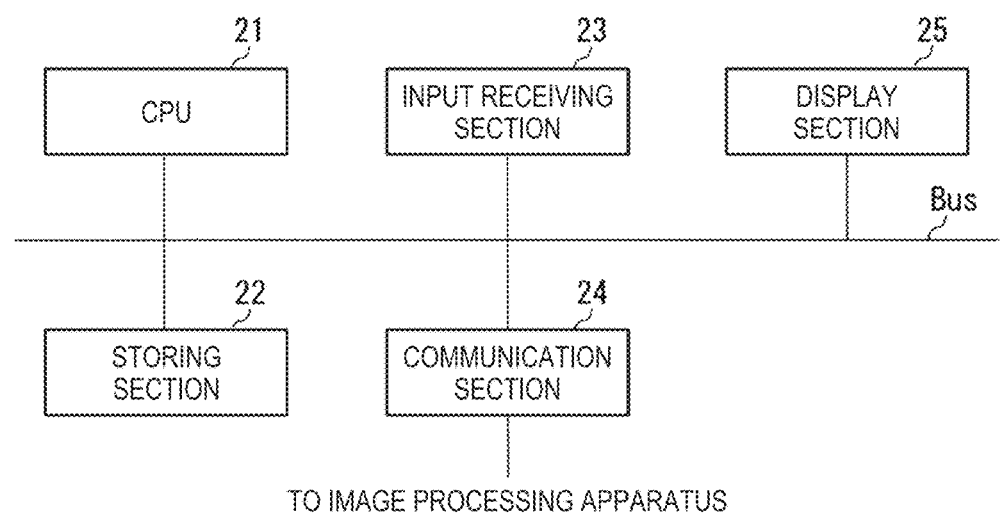
FIG. 2 is a diagram showing an example of the hardware configuration of an image processing apparatus.

The hardware configuration of the image processing apparatus 20 is explained below with reference to FIG. 2. FIG. 2 is a diagram showing an example of the hardware configuration of the image processing apparatus 20. The image processing apparatus 20 includes, for example, a CPU (Central Processing Unit) 21, a storing section 22, an input receiving section 23, a communication section 24, and a display section 25. The image processing apparatus 20 performs communication with the image pickup section 10 via the communication section 24. The components are communicably connected to one another via a bus Bus.

The CPU 21 executes various computer programs stored in the storing section 22.

The storing section 22 includes, for example, a HDD (Hard Disk Drive), an SSD (Solid State Drive), an EEPROM (Electrically Erasable Programmable Read-Only Memory), a ROM (Read-Only Memory), and a RAM (Random Access Memory). Note that the storing section 22 may be an external storage device connected by, for example, a digital input/output port such as a USB instead of a storage device incorporated in the image processing apparatus 20. The storing section 22 stores various kinds of information and images processed by the image processing apparatus 20 and computer programs (including computer programs for executing the tools).

The input receiving section 23 is, for example, a keyboard, a mouse, a touch pad, or another input device. Note that the input receiving section 23 may be configured integrally with the display section 25 as a touch panel.

The communication section 24 includes, for example, a digital input/output port such as a USB and an Ethernet (registered trademark) port.

The display section 25 is, for example, a liquid crystal display panel or an organic EL (Electro Luminescence) display panel.

Functional Configuration of the Image Processing Apparatus

Figure 3:
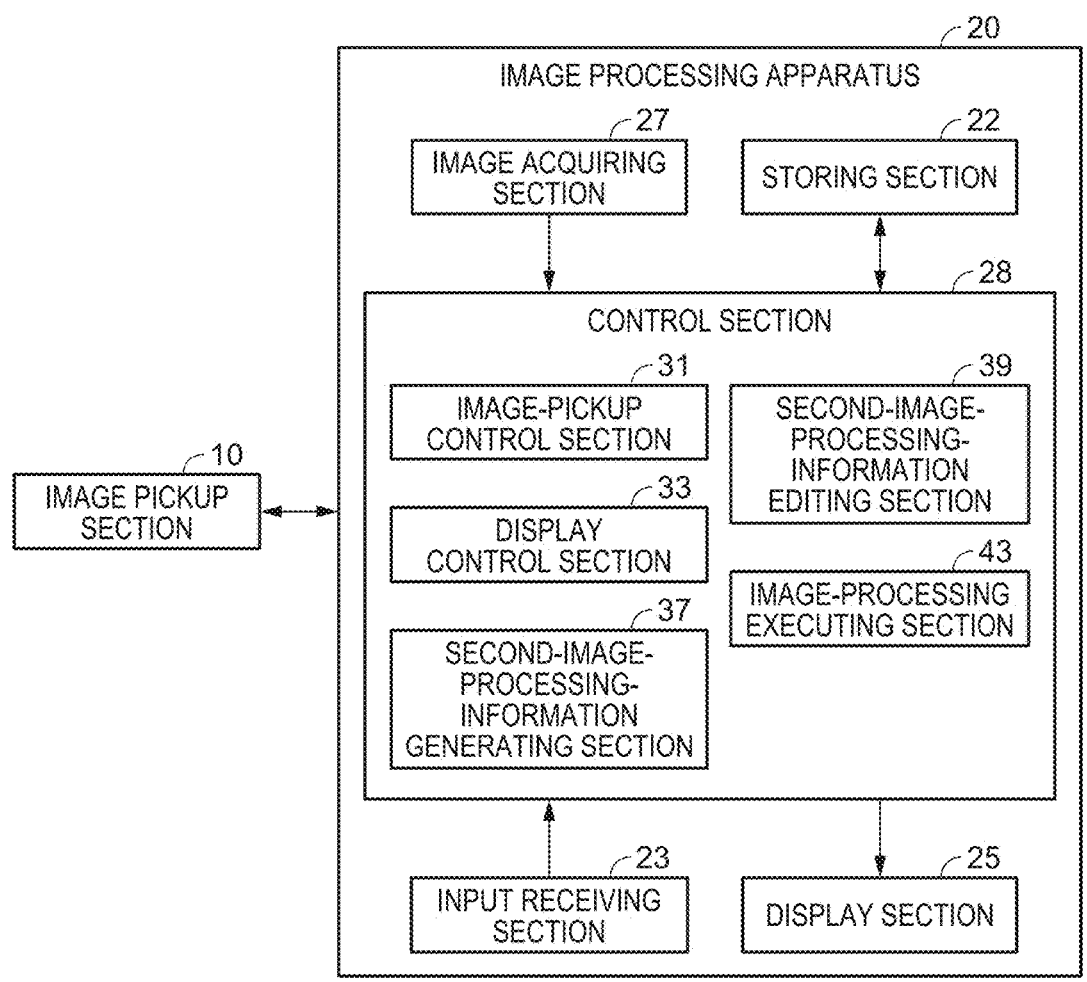
FIG. 3 is a diagram showing an example of the functional configuration of the image processing apparatus.

The functional configuration of the image processing apparatus 20 is explained below with reference to FIG. 3. FIG. 3 is a diagram showing an example of the functional configuration of the image processing apparatus 20. The image processing apparatus 20 includes a storing section 22, an input receiving section 23, a display section 25, an image acquiring section 27, and a control section 28.

The image acquiring section 27 acquires, from the image pickup section 10, a picked-up image picked up by the image pickup section 10.

The control section 28 controls the entire image processing apparatus 20. The control section 28 includes an image-pickup control section 31, a display control section 33, a second-image-processing-information generating section 37, a second-image-processing-information editing section 39, and an image-processing executing section 43. The functional sections included in the control section 28 is realized by, for example, the CPU 21 executing various computer programs stored in the storing section 22. A part or all of the functional sections may be hardware functional sections such as an LSI (Large Scale Integration) and an ASIC (Application Specific Integrated Circuit).

The image-pickup control section 31 causes the image pickup section 10 to pick up an image of an image pickup range including the target object O.

The display control section 33 causes, on the basis of operation from the user received by the input receiving section 23, the display section 25 to display various screens including a GUI (Graphical User Interface).

The second-image-processing-information generating section 37 generates, on the basis of one or more kinds of tool information selected by the user using the input receiving section 23 on a screen that the display control section 33 causes the display section 25 to display, instance information indicating an instance configured by tools indicated by the respective kinds of tool information. The second-image-processing-information generating section 37 stores the generated instance information in the storing section 22.

The second-image-processing-information editing section 39 edits, on the basis of operation from the user received by the input receiving section 23 on the screen that the display control section 33 causes the display section 25 to display, the instance information stored in the storing section 22.

The image-processing executing section 43 executes a tool indicated by tool information selected by the user using the input receiving section 23 on the screen that the display control section 33 causes the display section 25 to display. The image-processing executing section 43 executes each of a plurality of tools configuring an instance indicated by instance information selected by the user using the input receiving section 23 on the screen that the display control section 33 causes the display section 25 to display. In these cases, the image-processing executing section 43 executes the tool on the basis of parameters input by the user using the input receiving section 23 on the screen that the display control section 33 causes the display section 25 to display.

Specific Example of Processing Performed by the Control Section

A specific example of processing performed by the control section 28 is explained with reference to FIGS. 4 to 8. Note that, as an example of the processing performed by the control section 28, processing performed by the control section 28 when the user selects instance information on a main screen, which the display control section 33 causes the display section 25 to display, and executes each of a plurality of tools configuring an instance indicated by the selected instance information is explained.

The main screen in this example is a screen on which the user performs generation, editing, deletion, execution, and the like of an instance. The generation of an instance means selecting a plurality of tools and generating instance information associated with the selected tools. The editing of an instance includes addition of a new tool to a plurality of tools configuring the instance and deletion of a part of the plurality of tools configuring the instance. The deletion of an instance is deletion of all of a plurality of tools configuring the instance. The execution of an instance is execution of a plurality of tools configuring the instance. The main screen is a screen on which a result of image processing executed in the image processing apparatus 20 is displayed. Note that the main screen may be a screen on which the user executes other processing in addition to the above and may be a screen on which other information is displayed.

Figure 4:
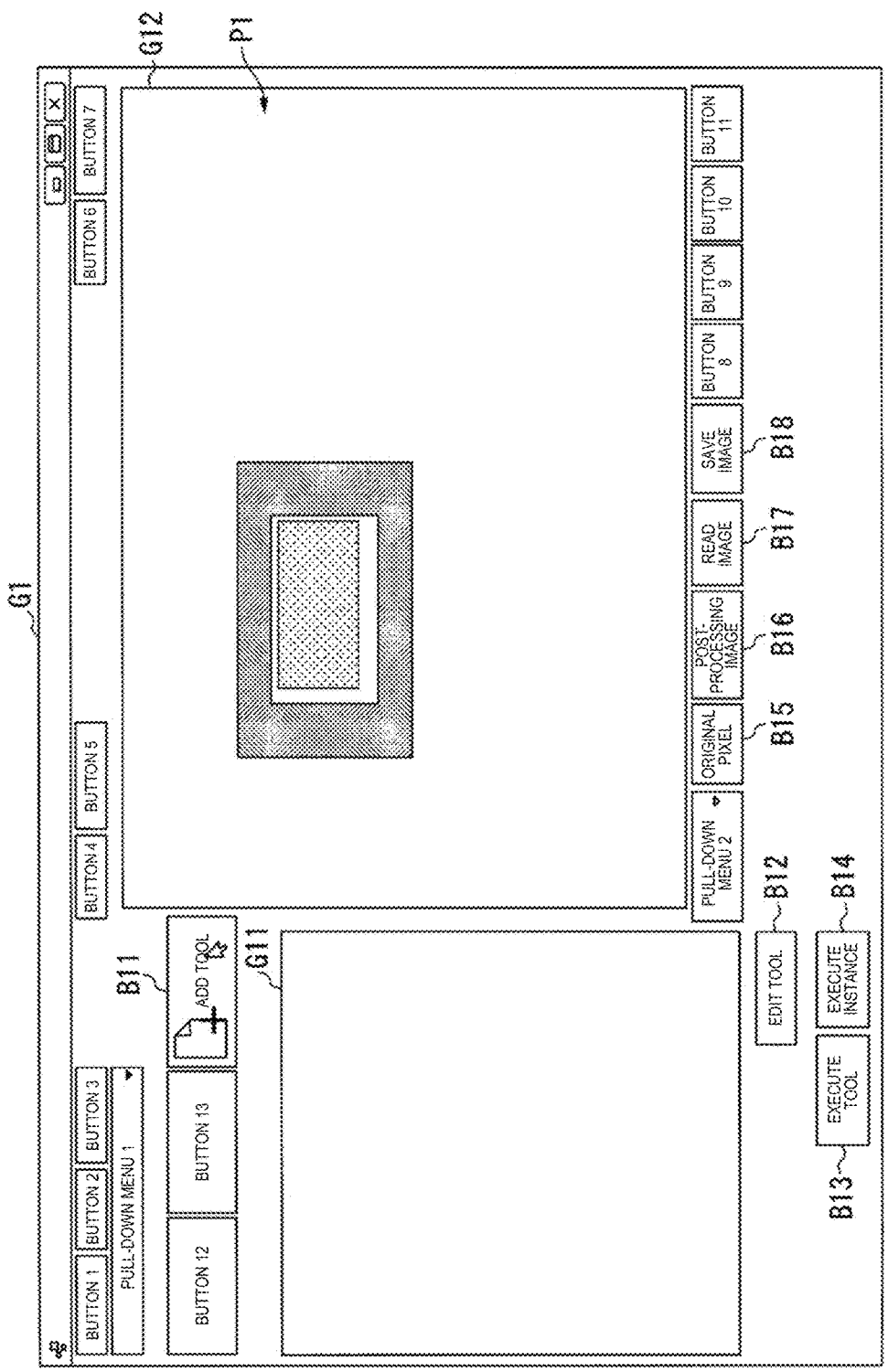
FIG. 4 is a diagram showing an example of a main screen.

The main screen is explained with reference to FIG. 4. FIG. 4 is a diagram showing an example of the main screen. A main screen G1, which is the example of the main screen shown in FIG. 4, includes a region G11, a region G12, a plurality of buttons including buttons B11 to B18, and a plurality of pull-down menus. Note that the main screen G1 may include other information, images, character strings, and GUIs instead of a part or all of the plurality of buttons excluding the buttons B11 to B18 and the plurality of pull-down menus or may include other information, images, character strings, and GUIs in addition to all of the plurality of buttons and the pull-down menus.

Tool information selected by the user is displayed in the region G11. For example, when tool information is selected by the user, the display control section 33 displays the selected tool information in the region G11. When instance information is selected by the user, the display control section 33 displays tool information indicating each of a plurality of tools configuring an instance indicated by the selected instance information in the region G11.

In the region G12, an image set as a target on which the user performs image processing, that is, pre-processing image, which is the image before various kinds of image processing are performed on the image, and a post-processing image, which is the image after the various kinds of image processing are performed on the image, are displayed. The image set as the target on which the user performs the image processing may be a picked-up image acquired from the image pickup section 10 by the image acquiring section 27 or may be an image stored in the storing section 22 in advance. For example, when the picked-up image is selected as the image set as the target on which the user performs the image processing, the display control section 33 displays the selected picked-up image in the region G12.

The button B11 is a button for displaying a selecting method selection screen for selecting a selecting method for a tool used by the user to perform desired image processing. When the selection operation (depression, click, or tap) is performed on the button B11 by the user, the display control section 33 displays the selecting method selection screen over the main screen G1.

The button B12 is a button for displaying an editing screen for editing a tool indicated by tool information selected by the user in the tool information displayed in the region G11. The editing of the tool includes input, addition, deletion, and the like of parameters associated with the tool. When the tool is the prior processing, the editing of the tool includes selection, addition, deletion, and the like of the filter processing executed in the prior processing in addition to the above. When the button B12 is depressed, the display control section 33 displays the editing screen in the region G11 of the main screen G1.

The button B13 is a button for executing, on the image set as the target on which the image processing is performed, the tool indicated by the tool information selected by the user in the tool information displayed in the region G11. When the button B13 is depressed, the image-processing executing section 43 executes, on the image, the tool indicated by the tool information selected by the user in the tool information displayed in the region G11.

The button B14 is a button for executing, on the image set as the target on which the image processing is performed, a tool indicated by each of one or more kinds of tool information displayed in the region G11. When the button B14 is depressed, the image-processing executing section 43 selects the tool information, which is displayed in the region G11, in order from the top one by one and executes, in order, the tools indicated by the selected tool information on the image set as the target on which the image processing is performed.

The button B15 is a button for displaying the pre-processing image in the region G12 instead of the post-processing image. When the button B15 is depressed in a state in which the post-processing image is displayed in the region G12, the display control section 33 displays the pre-processing image in the region G12.

The button B16 is a button for displaying the post-processing image in the region G12 instead of the pre-processing image. When the button B16 is depressed in a state in which the pre-processing image is displayed in the region G12, the display control section 33 displays the post-processing image in the region G12.

The button B17 is a button for displaying an image selection screen for reading out, from the storing section 22, an image to be displayed in the region G12. When the button B17 is depressed, the display control section 33 displays the image selection screen over the main screen G1.

The button B18 is a button for displaying an image storage screen for storing (saving), in the storing section 22, an image displayed in the region G12. When the button B18 is depressed, the display control section 33 displays the image storage screen over the main screen G1.

Figure 5:
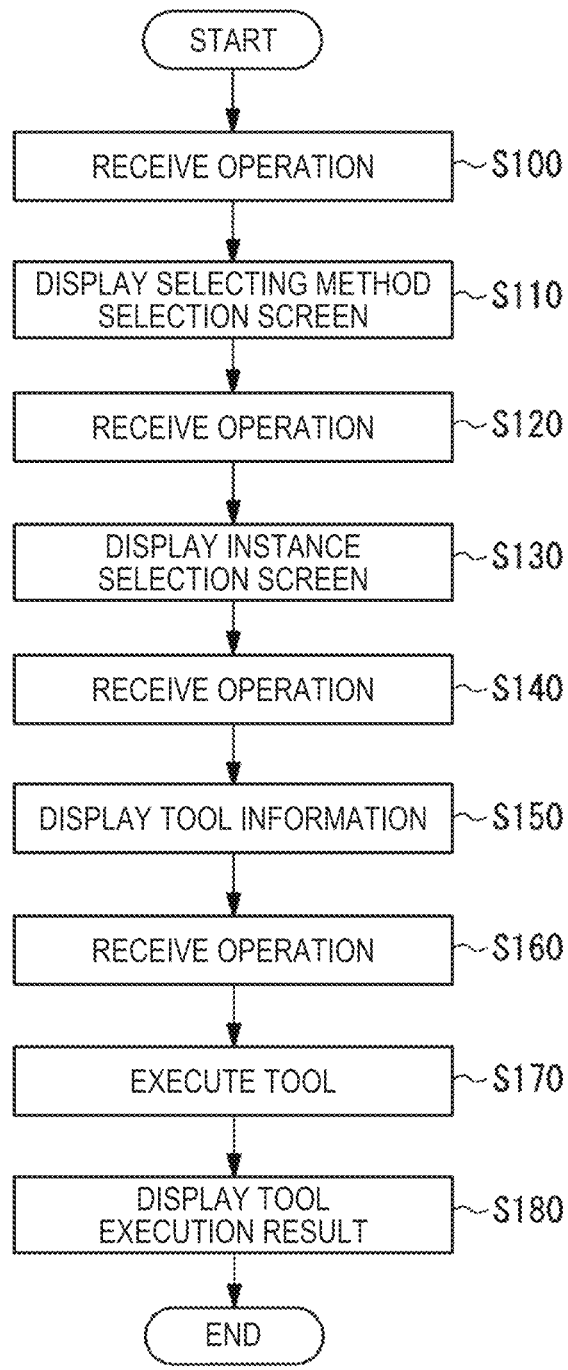
FIG. 5 is a flowchart for explaining an example of a flow of processing performed by a control section when an instance is selected by a user on the main screen and each of a plurality of tools configuring the selected instance is executed.

When instance information is selected by the user on the main screen G1 and each of a plurality of tools configuring an instance indicated by the selected instance information is executed, the control section 28 performs, for example, kinds of processing of the flowchart of FIG. 5. FIG. 5 is a flowchart for explaining an example of a flow of processing performed by the control section 28 when an instance is selected by the user on the main screen G1 and each of a plurality of tools configuring the selected instance is executed. Note that processing in step S100 of the flowchart of FIG. 5 is processing performed after the image acquiring section 27 acquires a picked-up image from the image pickup section 10 and is processing performed after the display control section 33 causes the display section 25 to display the main screen G1.

The display control section 33 receives, with the input receiving section 23, operation for depressing the button B11 from the user on the main screen G1 (step S100). Subsequently, the display control section 33 displays a selecting method selection screen over the main screen G1 on the basis of the operation received in step S100 (step S110).

Figure 6:
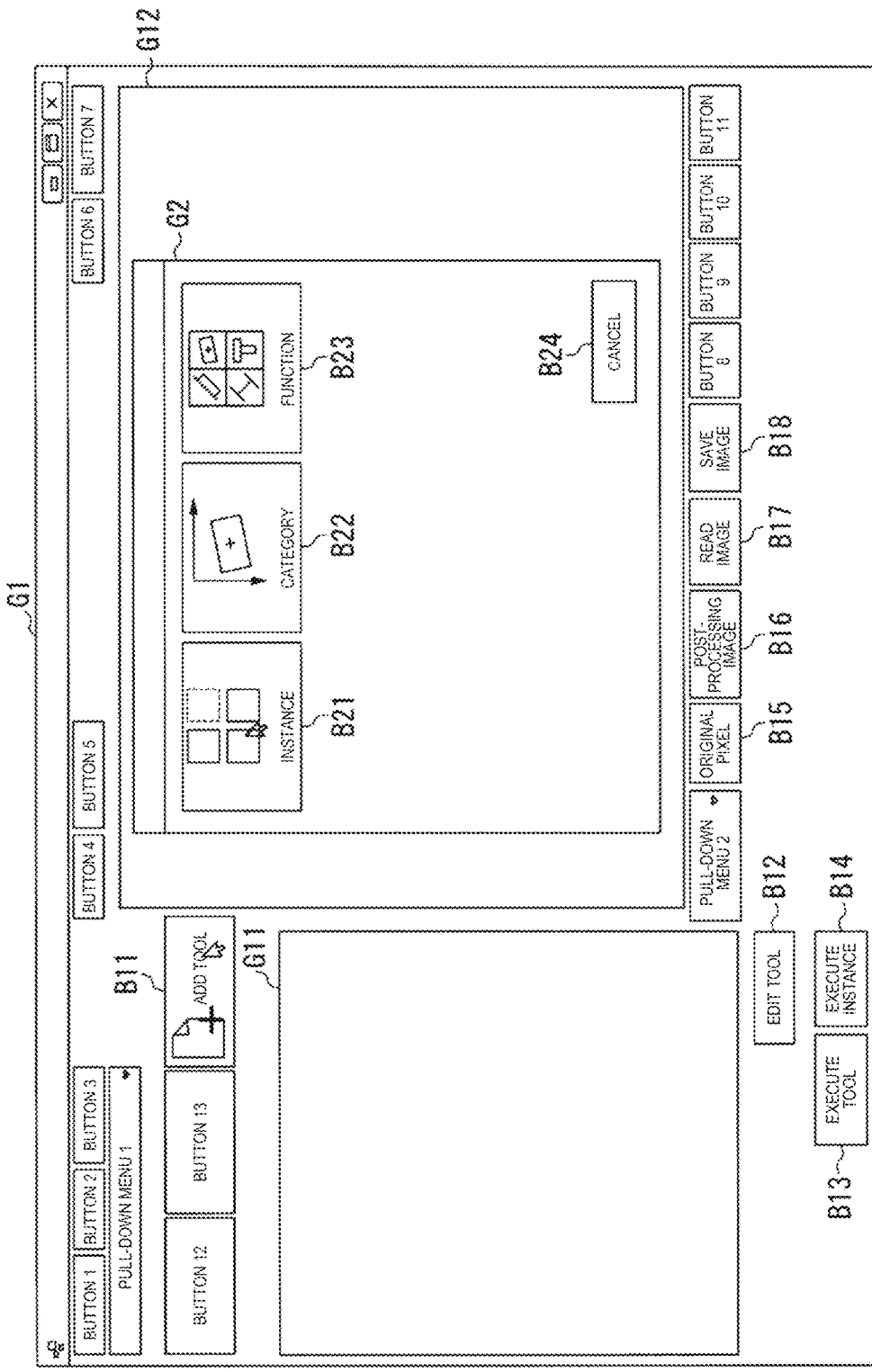
FIG. 6 is a diagram showing an example of a selecting method selection screen.

The selecting method selection screen is explained with reference to FIG. 6. FIG. 6 is a diagram showing an example of the selecting method selection screen. In this example, a selecting method selection screen G2, which is the example of the selecting method selection screen shown in FIG. 6, is displayed over the region G12 of the main screen G1. The selecting method selection screen G2 includes a button B21, a button B22, a button B23, and a button B24. Note that the selecting method selection screen G2 may include other information, images, character strings, and GUIs instead of a part or all of the button B22, the button B23, and the button B24 or may include other information, images, character strings, and GUIs in addition to all of the button B22, the button B23, and the button B24.

The button B21 is a button for displaying an instance selection screen for selecting an instance. When the button B21 is depressed, the display control section 33 displays the instance selection screen over the selecting method selection screen G2.

The button B22 is a button for displaying a first tool selection screen for selecting a tool from a list of tools classified for each of categories. When the button B22 is depressed, the display control section 33 displays the first tool selection screen over the selecting method selection screen G2.

The button B23 is a button for displaying a second tool selection screen for selecting a tool from a list of tools classified for each of functions. When the button B23 is depressed, the display control section 33 displays the second tool selection screen over the selecting method selection screen G2.

The button B24 is a button (a cancel button) for deleting (closing) the selecting method selection screen G2. When the button B24 is depressed, the display control section 33 deletes the selecting method selection screen G2.

After the selecting method selection screen G2 is displayed in step S110, the display control section 33 receives, with the input receiving section 23, operation for depressing the button B21 from the user on the selecting method selection screen G2 (step S120). Subsequently, the display control section 33 displays the instance selection screen over the selecting method selection screen G2 (step S130).

Figure 7:
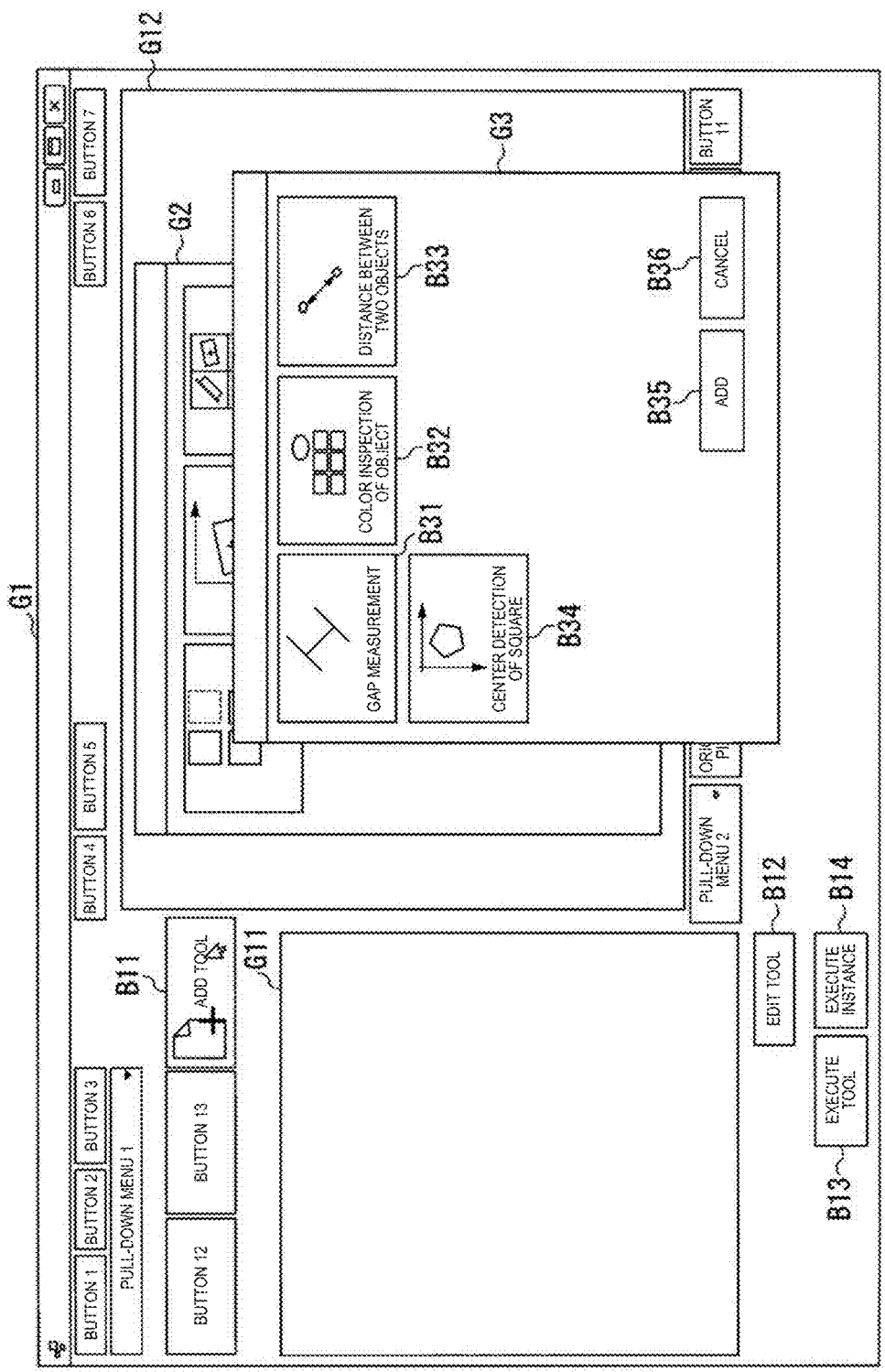
FIG. 7 is a diagram showing an example of an instance selection screen.

The instance selection screen is explained with reference to FIG. 7. FIG. 7 is a diagram showing an example of the instance selection screen. In this example, an instance selection screen G3, which is the example of the instance selection screen shown in FIG. 7, is displayed over the selecting method selection screen G2. The instance selection screen G3 includes a button B31, a button B32, a button B33, a button B34, a button B35, and a button B36. Note that the instance selection screen G3 may include other information, images, character strings, and GUIs in addition to all of the button B31, the button B32, the button B33, the button B34, the button B35, and the button B36.

The button B31 is tool information indicating gap measurement processing among a plurality of instances. When the button B31 is depressed, the display control section 33 deletes (closes) the selecting method selection screen G2 and the instance selection screen G3 and displays, in the region G11 of the main screen G1, tool information indicating a plurality of tools configuring an instance indicated by the depressed button B31.

The button B32 is tool information indicating object color inspection processing among the plurality of instances. When the button B32 is depressed, the display control section 33 deletes (closes) the selecting method selection screen G2 and the instance selection screen G3 and displays, in the region G11 of the main screen G1, tool information indicating a plurality of tools configuring an instance indicated by the depressed button B32.

The button B33 is tool information indicating inter-two object distance calculation processing among the plurality of instances. When the button B33 is depressed, the display control section 33 deletes (closes) the selecting method selection screen G2 and the instance selection screen G3 and displays, in the region G11 of the main screen G1, tool information indicating a plurality of tools configuring an instance indicated by the depressed button B33.

The button B34 is tool information indicating square center detection processing among the plurality of instances. When the button B34 is depressed, the display control section 33 deletes (closes) the selecting method selection screen G2 and the instance selection screen G3 and displays, in the region G11 of the main screen G1, tool information indicating a plurality of tools configuring an instance indicated by the depressed button B34.

The button B35 is a button for displaying instance information addition screen for adding new instance information to the instance selection screen G3. When the button B35 is depressed, the display control section 33 displays the instance information addition screen over the instance selection screen G3.

The button B36 is a button (a cancel button) for deleting (closing) the instance selection screen G3. When the button B36 is depressed, the display control section 33 deletes the instance selection screen G3.

After the instance selection screen G3 is displayed in step S130, the display control section 33 receives, with the input receiving section 23, operation for depressing the button B31 from the user via the instance selection screen G3 (step S140). Subsequently, the display control section 33 deletes (closes) the selecting method selection screen G2 and the instance selection screen G3 and displays, in the region G11 of the main screen G1, tool information indicating each of a plurality of tools configuring gap measuring processing, which is an instance indicated by the button B31 depressed in step S140 (step S150).

Figure 8:
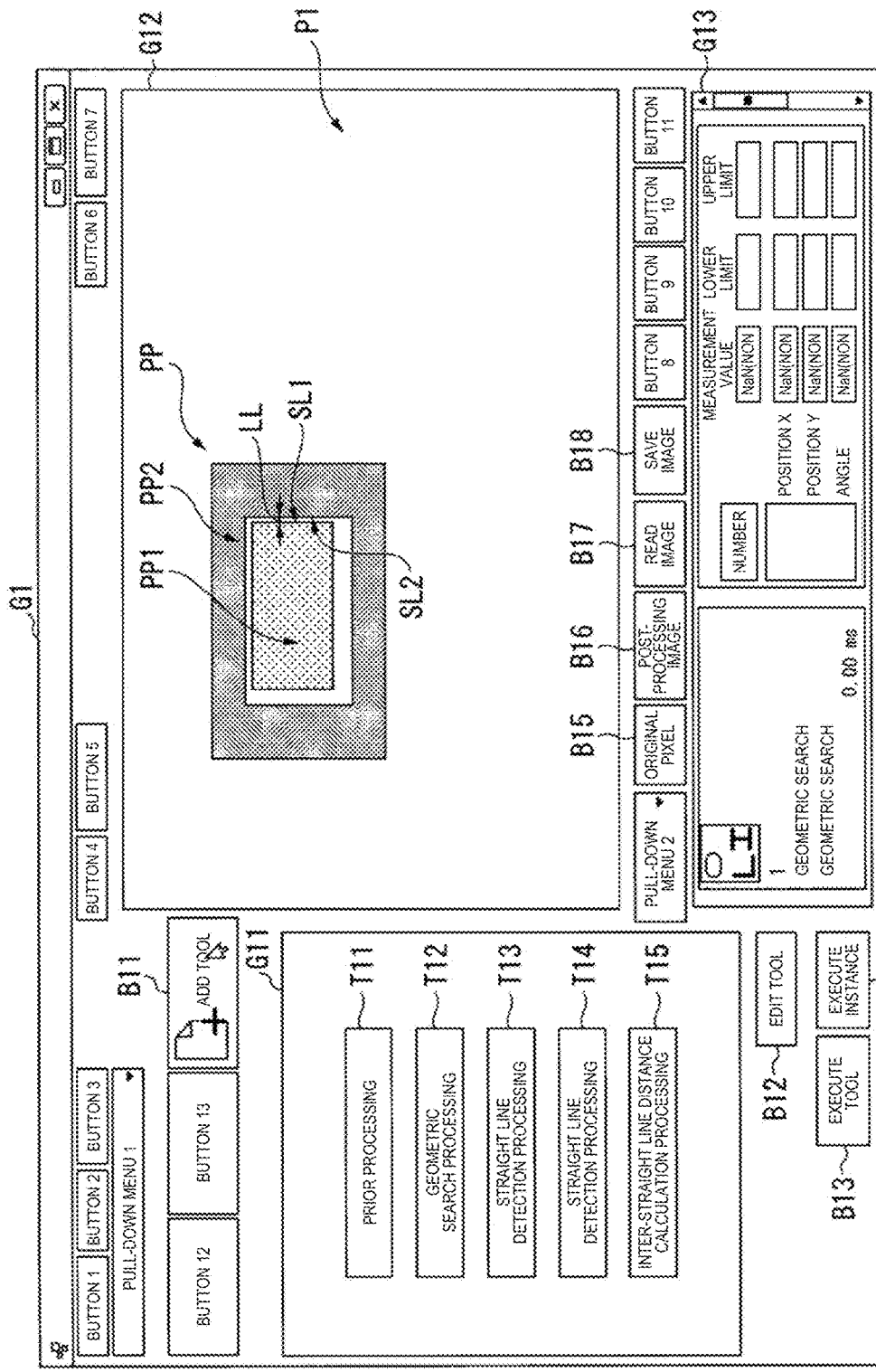
FIG. 8 is a diagram showing an example of a main screen on which tool information indicating tools configuring an instance is displayed.

The main screen G1, on which tool information indicating tools configuring an instance is displayed, is explained with reference to FIG. 8. FIG. 8 is a diagram showing an example of a main screen on which tool information indicating tools configuring an instance is displayed. As shown in FIG. 8, when the button B31 is depressed on the instance selection screen G3, the display control section 33 displays, in the region G11, tool information T11, tool information T12, tool information T13, tool information T14, and tool information T15 respectively indicating the prior processing, the geometric search processing, the straight line detection processing, the straight line detection processing, and the inter-straight-line distance calculation processing, which are five tools configuring the gap measurement processing, which is the instance indicated by the button B31 selected in step S140.

After the main screen G1 shown in FIG. 8 is displayed, the user inputs parameters respectively associated with the kinds of tool information displayed in the region G11 and depresses the button B14. Consequently, the user can easily calculate a distance between two straight lines desired by the user. When the button B14 is depressed in a state of the main screen G1 shown in FIG. 8, the image-processing executing section 43 executes, on an image set as a target on which image processing is performed, the five kinds of tool information, which are displayed in the region G11, in order from the top one by one. Specifically, the image-processing executing section 43 executes, on the image set as the target on which the image processing is performed, the tools in the order of the prior processing indicated by the tool information T11, the geometric search processing indicated by the tool information T12, the straight line detection processing indicated by the tool information T13, the straight line detection processing indicated by the tool information T14, and the inter-straight-line distance calculation processing indicated by the tool information T15.

In this example, the information serving as the target on which the image processing is performed is an image PP displayed in the region G12. In the image PP, images of an object PP1 and an object PP2 are picked up. Note that, in this example, in the gap measurement processing, which is an instance selected by the user, geometric characteristics detected in the geometric search processing indicated by the tool information T12 from the images of the object PP1 and the object PP2 included in the image PP are input as parameters respectively associated with the straight line detection processing indicated by the tool information T13 and the straight line detection processing indicated by the tool information T14. In the gap measurement processing, two straight lines detected from the image PP respectively by the straight line detection processing indicated by the tool information T13 and the straight line detection processing indicated by the tool information T14 are input as parameters associated with the inter-straight-line distance calculation processing indicated by the tool information T15.

Note that, as an example, a straight line SL1, which is a straight line portion of the image of the object PP1 included in the image PP, is detected by the straight line detection processing indicated by the tool information T13 and a straight line SL2, which is a straight line portion of the image of the object PP2 included in the image PP, is detected by the straight line detection processing indicated by the tool information T14.

After the tool information is displayed in the region G11 of the main screen G1 in step S150, the image-processing executing section 43 receives, with the input receiving section 23, operation for depressing the button B14 from the user via the main screen G1 (step S160). Subsequently, the image-processing executing section 43 executes, on the image set as the target on which the image processing is performed (in this example, the image PP), the tools in the order of the prior processing indicated by the tool information T11, the geometric search processing indicated by the tool information T12, the straight line detection processing indicated by the tool information T13, the straight line detection processing indicated by the tool information T14, and the inter-straight-line distance calculation processing indicated by the tool information T15 (step S170). As a result of the tools being executed, a distance LL, which is a distance between the straight line SL1 and the straight line SL2, is calculated. Subsequently, the display control section 33 displays, on the main screen G1, a region G13 where a result of execution of the tool in step S170 (i.e., the distance LL) is displayed. In this example, the region G13 is a region below the region G12 and a region on the right of the region G11. The display control section 33 displays information indicating the result in the region G13 (step S180).

In this way, the image processing apparatus 20 selects instance information on the basis of operation received from the user and executes a plurality of tools configuring an instance indicated by the selected instance information. For example, as explained above, when a character string or an image included in the instance information represents image processing performed in the past, the user can easily select, on the basis of the instance information, an instance in which desired image processing is performed even if the user does not have expert knowledge concerning image processing. As a result, the user can easily perform the desired image processing with the image processing apparatus 20.

The image processing apparatus 20 can select instance information and execute a plurality of tools configuring an instance indicated by the selected instance information. Therefore, every time image processing is performed, tool information indicating a tool corresponding to the image processing does not have to be selected again. It is possible to achieve efficiency of work concerning the image processing.

Processing by the Control Section in Editing of an Instance and Instance Information Editing of an instance and instance information is explained with reference to FIG. 8 again.

Tool information indicating a new tool can be added to the region G11 of the main screen G1 shown in FIG. 8 instead of a part or all of the displayed plurality of kinds of tool information. For example, when the button B11 is depressed by the user in the state of the main screen G1 shown in FIG. 8 and the button B22 is depressed on the selecting method selection screen G2 shown in FIG. 6, the display control section 33 displays a not-shown first tool selection screen over the main screen G1. As explained above, the first tool selection screen includes a list of tool information classified for each of categories.

When tool information included in the list is selected by the user on the first tool selection screen, the tool information selected by the user is added to the region G11 of the main screen G1. The second-image-processing-information editing section 39 associates anew, with instance information indicating an instance configured by tools respectively indicated by kinds of tool information displayed in the region G11 before the tool information is added anew, tools respectively indicated by tool information displayed in the region G11 after the tool information is added anew.

The order of the tool information in the region G11 can be changed by, for example, dragging the tool information. When the order is changed, the second-image-processing-information editing section 39 associates anew, with instance information indicating an instance configured by tools respectively indicated by kinds of tool information displayed in the region G11 before the order is changed, tools respectively indicated by tool information displayed in the region G11 after the order is changed.

A part or all of the plurality of kinds of tool information displayed in the region G11 of the main screen G1 can be deleted. For example, when the user selects the tool information T11 from the region G11 to display a right click menu and selects "delete" of the right click menu, the display control section 33 deletes the tool information T11 from the region G11. The second-image-processing-information editing section 39 associates anew, with instance information indicating an instance configured by tools respectively indicated by kinds of tool information displayed in the region G11 before the tool information T11 is deleted, tools respectively indicated by tool information displayed in the region G11 after the tool information T11 is deleted.

In this way, the user can edit tools configuring an instance indicated by instance information. As a result, the user can easily edit, with the image processing apparatus 20, the instance indicated by the instance information to an instance in which desired image processing is performed.

In the image processing apparatus 20, since the instance can be easily edited, when image processing partially different from image processing performed in the past (e.g., image processing different from the image processing performed in the past only in parameters and a part of tools) is performed, the user can easily perform desired image processing by editing instance information indicating an instance in which image processing same as image processing performed in the past is performed. As a result, the image processing apparatus 20 can improve efficiency of work concerning image processing.

Processing by the Control Section in Generation of an Instance and Instance Information Generation of an instance and instance information is explained below with reference to FIG. 7 again.

When the button B35 of the instance selection screen G3 shown in FIG. 7 is depressed, the display control section 33 displays a not-shown instance information addition screen over the main screen G1 as explained above. The instance information addition screen includes a field to which a name of an instance is input. The user can input, on the instance information addition screen, a name of an instance to be generated anew.

After the input of the name of the instance by the user ends on the instance information addition screen, the second-image-processing-information generating section 37 generates instance information indicating the instance having the input name. A tool is not associated with the instance indicated by the generated instance information. The display control section 33 displays, on the instance selection screen G3, the instance information generated by the second-image-processing-information generating section 37. For example, when a name "XXX" is input on the instance information addition screen by the user, the second-image-processing-information generating section 37 generates instance information indicating an instance having the name "XXX". The display control section 33 displays the instance information generated by the second-image-processing-information generating section 37 in a region where buttons are not disposed on the instance selection screen G3 shown in FIG. 7. A region where buttons are not disposed is, for example, a region on the right of the button B34.

As explained above, immediately after new instance information is displayed, a tool is not associated with an instance indicated by the instance information. Therefore, with the method explained above in the processing by the control section in editing of an instance and instance information, the user can associate one or more tools with an instance indicated by instance information displayed anew on the instance selection screen G3. Consequently, the user can easily generate instance information indicating an instance in which desired image processing is performed.

Processing by the Control Section in Input of Parameters

Input of parameters on the editing screen explained above is explained with reference to FIGS. 9 and 10. After tool information is selected by the user from tool information displayed in the region G11 of the main screen G1 shown in FIG. 8, the editing screen is displayed in the region G11 when the button B12 is depressed. That is, when the button B12 is depressed after the tool information is selected by the user from the tool information displayed in the region G11 of the main screen G1 shown in FIG. 8, the display control section 33 displays the editing screen in the region G11. At this point, the display control section 33 displays, in the region G11, an editing screen for editing parameters associated with a tool indicated by the tool information selected by the user.

Figure 9:
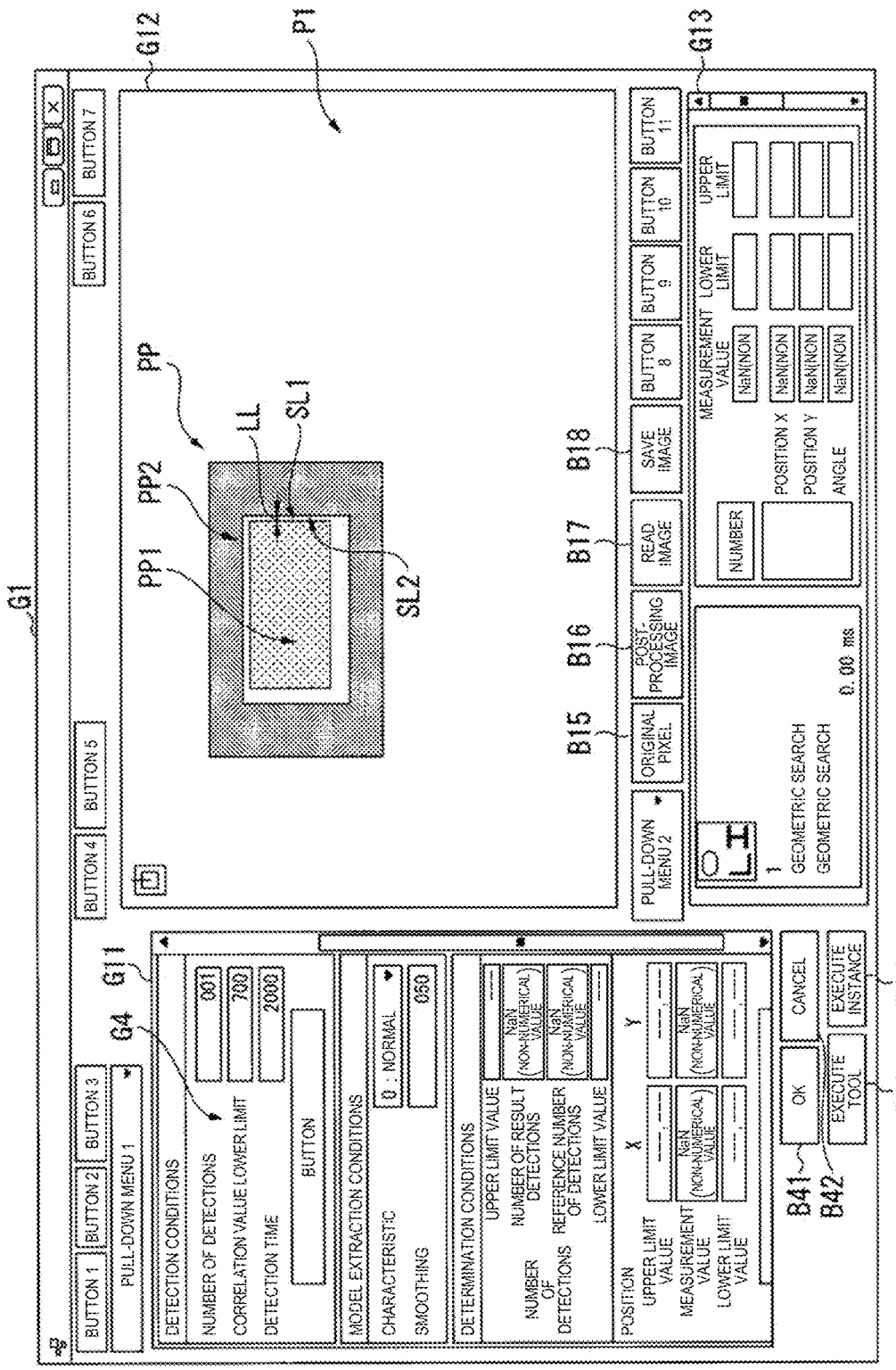
FIG. 9 is a diagram showing an example of the main screen on which an editing screen is displayed.

FIG. 9 is a diagram showing an example of the main screen on which an editing screen is displayed. In this example, an editing screen G4, which is an example of the editing screen shown in FIG. 9, is displayed in the region G11 of the main screen G1. The editing screen G4 shown in FIG. 9 is an editing screen for editing parameters associated with the geometric search processing indicated by the tool information T12.

The editing screen G4 includes a plurality of fields to which various parameters associated with tools are input, a pull-down menu for selecting the parameters, and a plurality of buttons including a button B41 and a button B42. Note that the editing screen G4 may include other information, images, character strings, and GUIs instead of a part of all of the plurality of buttons excluding the button B41 and the button B42 or may include other information, images, character strings, and GUIs in addition to all of the plurality of buttons.

The button B41 is a button for deciding parameters input or selected on the editing screen G4 and associating the parameters with tools. In the example shown in FIG. 9, the button B41 is a button for associating the parameters to the geometric search processing indicated by the tool information T11. When the button B41 is depressed, the display control section 33 deletes (closes) the editing screen G4 and changes the main screen G1 to the state shown in FIG. 8.

The button B42 is a button (a cancel button) for deleting (closing) the editing screen G4. When the button B42 is depressed, the display control section 33 deletes (closes) the editing screen G4 and changes the main screen G1 to the state shown in FIG. 8.

In this way, the editing screen for editing the parameters associated with the tools other than the prior processing among the tools has a configuration same as the configuration of the editing screen shown in FIG. 9. Therefore, explanation of the configuration is omitted. Unlike other editing screens, the editing screen associated with the prior processing includes a button for displaying a filter processing selection screen for selecting filter processing performed in the prior processing. When the button is depressed, the display control section 33 displays a filter processing selection screen over the main screen G1.

Figure 10:
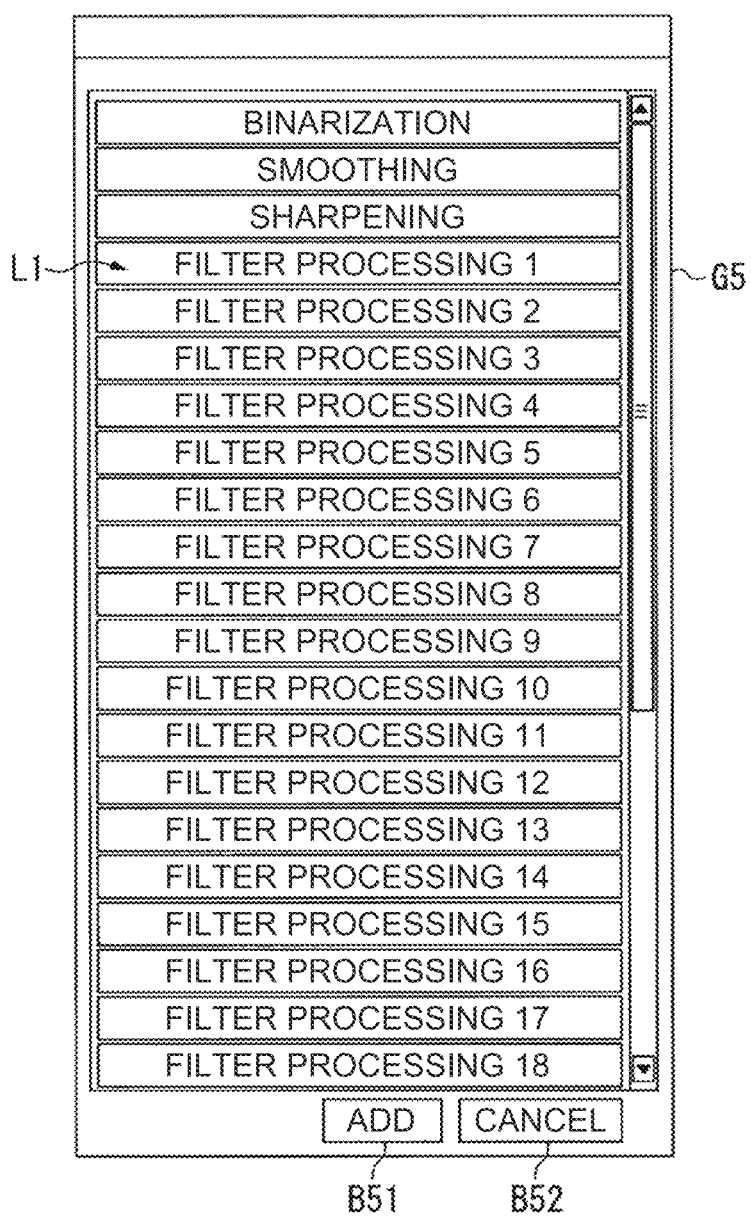
FIG. 10 is a diagram showing an example of a filter processing selection screen.

FIG. 10 is a diagram showing an example of the filter processing selection screen. A filter processing selection screen G5, which is an example of the filter processing selection screen shown in FIG. 10, includes a list L1 of kinds of filter processing information, which are kinds of information respectively indicating a plurality of kinds of filter processing, a button B51, and a button B52. Note that the filter processing selection screen G5 may include other information, images, character strings, and GUIs instead of one or both of the button B51 and the button B52 or may include other information, images, character strings, GUIs in addition to both of the button B51 and the button B52.

The list L1 includes a plurality of kinds of filter processing information such as filter processing information indicating binarization filter processing, filter processing information indicating smoothing filter processing, filter processing information indicating sharpening filter processing, and filter processing information indicating median filter processing. The user can select filter processing information indicating filter processing performed in the prior processing from the filter processing information included in the list L1 of the filter processing selection screen G5.

The button B51 is a button for deciding, as filter processing performed in the prior processing, the filter processing information selected by the user from the list L1 and associating the filter processing information with the prior processing. Note that one or more kinds of filter processing can be associated with the prior processing. Apart or all of the one of more kinds of filter processing may be kinds of filter processing having the same function. For example, when two kinds of smoothing filter processing are associated with the prior processing, the smoothing filter processing is performed twice in the prior processing.

The button B52 is a button (a cancel button) for deleting (closing) the filter processing selection screen G5. When the button B52 is depressed, the display control section 33 deletes the filter processing selection screen G5.

Note that, in the above explanation, a tool may be further configured by a plurality of kinds of other image processing. In this case, the tool is equivalent to the instance in the above explanation. The plurality of kinds of other image processing are equivalent to the tools in the above explanation. One of specific examples in this case is the relation between the prior processing and the filter processing explained above. In the above explanation, the other image processing may be configured by a plurality of instances. In this case, the instances are equivalent to the tools in the above explanation. The other image processing is equivalent to the instance in the above explanation.

Modification of the Embodiment

Figure 11:
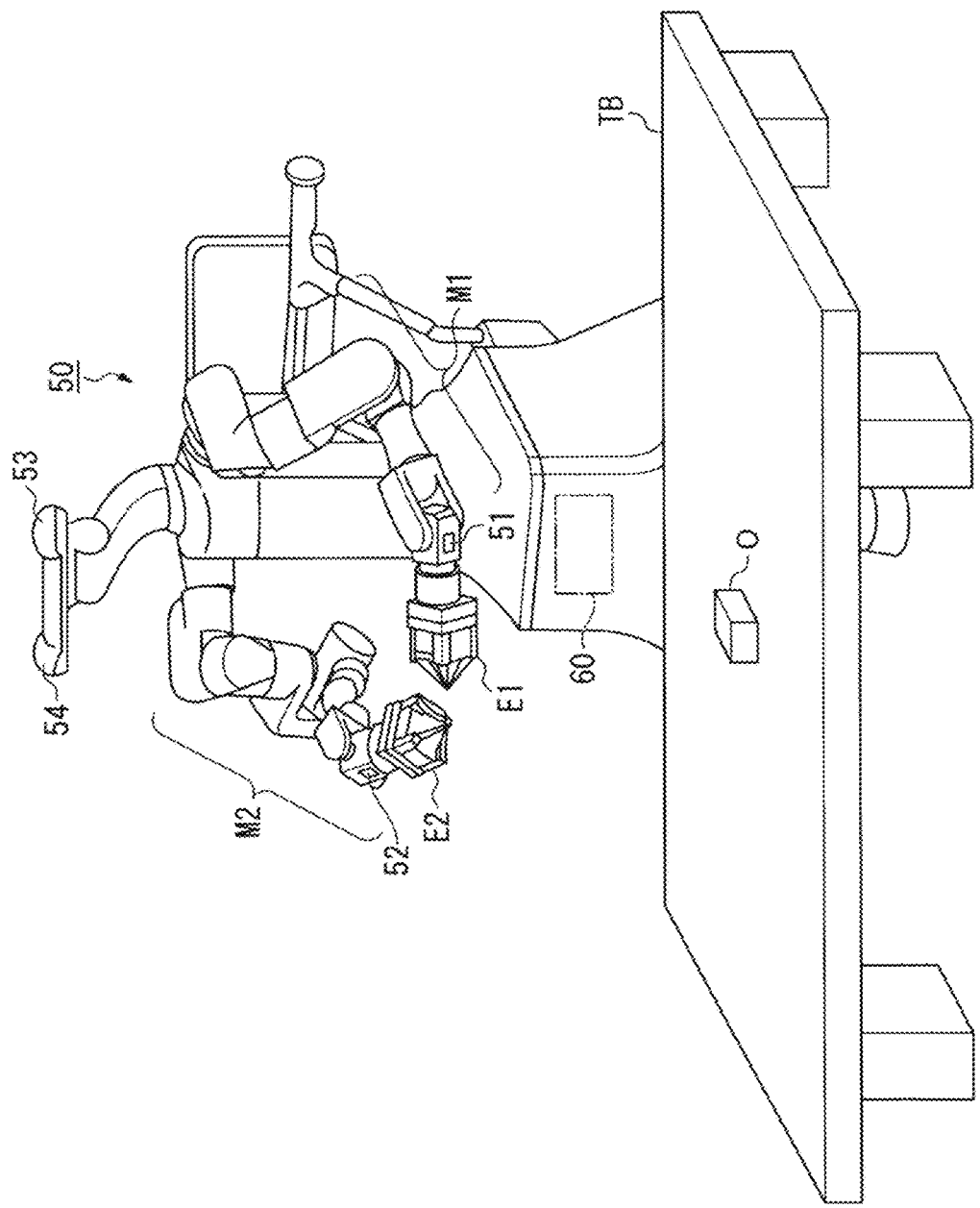
FIG. 11 is a configuration diagram showing an example of a robot according to a modification of the embodiment.
Figure 12:
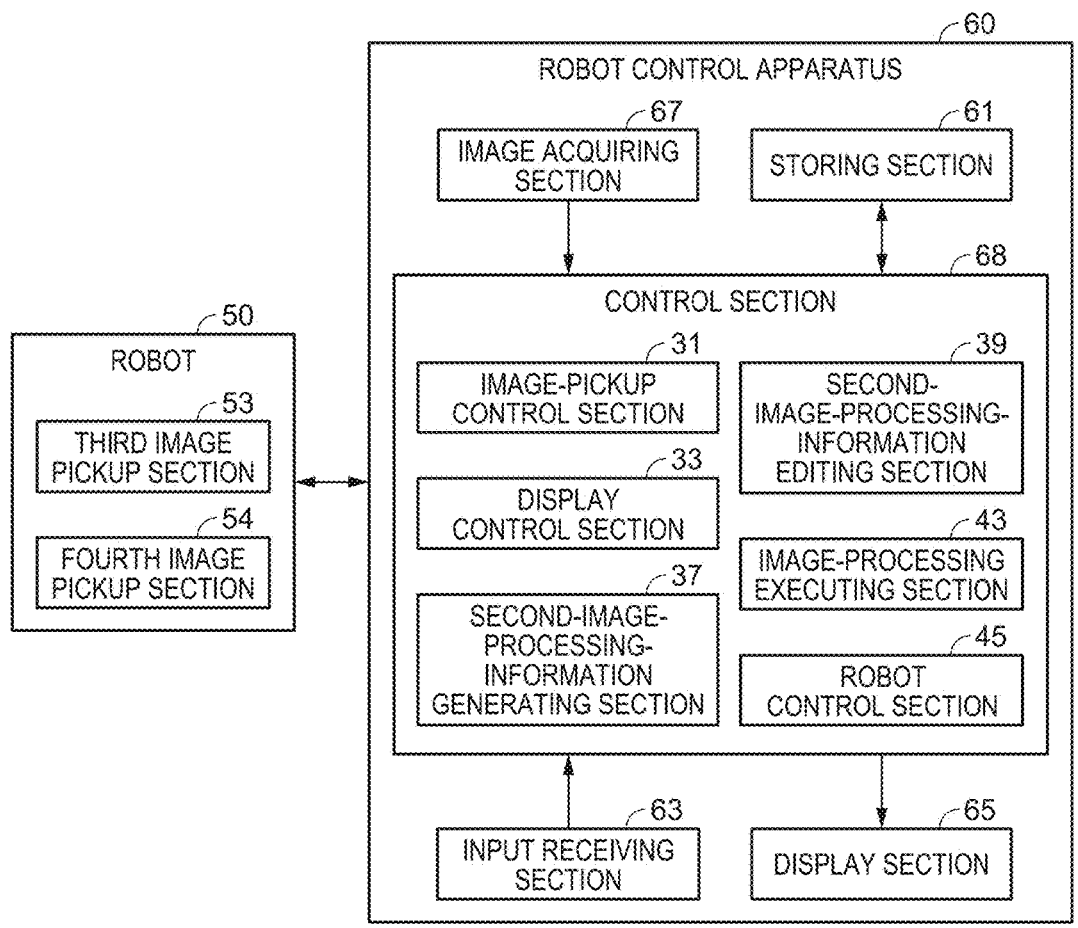
FIG. 12 is a diagram showing an example of the functional configuration of a robot control apparatus.

A modification of the embodiment is explained below with reference to FIGS. 11 and 12. Note that, in the modification of the embodiment, components same as the components in the embodiment are denoted by the same reference numerals and signs and explanation of the components is omitted. FIG. 11 is a configuration diagram showing an example of a robot 50 according to the modification of the embodiment. In the modification of the embodiment, a robot control apparatus 60 incorporated in the robot 50 includes a part of the functional sections included in the image processing apparatus 20 explained in the embodiment.

Configuration of the Robot

First, the configuration of the robot 50 is explained.

The robot 50 is a double-arm robot including a first arm, a second arm, a supporting table that supports the first arm and the second arm, and the robot control apparatus 60. The double-arm robot is a robot including two arms like the first arm and the second arm in this example. Note that the robot 50 may be a single-arm robot instead of the double-arm robot. The single-arm robot is a robot including one arm. For example, the single-arm robot includes one of the first arm and the second arm. The robot 50 may be a plural-arm robot including three or more arms instead of the double-arm robot.

The first arm includes a first end effector E1 and a first manipulator M1.

In this example, the first end effector E1 is an end effector including claw sections capable of gripping an object. Note that the first end effector E1 may be anther end effector such as an end effector including an electric driver instead of the end effector including the claw sections.

The first end effector E1 is communicably connected to the robot control apparatus 60 by a cable. Consequently, the first end effector E1 performs operation based on a control signal acquired from the robot control apparatus 60. Note that wired communication via the cable is performed according to a standard such as an Ethernet (registered trademark) or a USB (Universal Serial bus). The first end effector E1 may be connected to the robot control apparatus 60 by wireless communication performed according to a communication standard such as Wi-Fi (registered trademark).

The first manipulator M1 includes seven joints and a first image pickup section 51. The seven joints respectively include not-shown actuators. That is, the first arm including the first manipulator M1 is an arm of a seven-axis vertical multi-joint type. The first arm performs operation of a degree of freedom of seven axes through a cooperated operation of the supporting table, the first end effector E1, the first manipulator M1, and the actuators of the respective seven joints included in the first manipulator M1. Note that the first arm may operate at a degree of freedom of six axes or less or may operate at a degree of freedom of eight axes or more.

When the first arm operates at the degree of freedom of seven axes, the first arm can take more postures compared with when operating at the degree of freedom of six axes or less. Consequently, the first arm smoothly operates and can easily avoid interference with an object present around the first arm. When the first arm operates at the degree of freedom of seven axes, the first arm is easily controlled with small computational complexity compared with when the first arm operates at the degree of freedom of eight axes or more.

The seven actuators (included in the seven joints) included in the first manipulator M1 are respectively communicably connected to the robot control apparatus 60 by cables. Consequently, the actuators actuate the first manipulator M1 on the basis of a control signal acquired from the robot control apparatus 60. Note that wired communication via the cables is performed according to a standard such as an Ethernet (registered trademark) or a USB. A part or all of the seven actuators included in the first manipulator M1 may be connected to the robot control apparatus 60 by wireless communication performed according to a communication standard such as Wi-Fi (registered trademark).

The first image pickup section 51 is a camera including, for example, a CCD or a CMOS, which is an image pickup device that converts collected light into an electric signal. In this example, the first image pickup section 51 is included in a part of the first manipulator M1. Therefore, the first image pickup section 51 moves according to the movement of the first arm. A range in which the first image pickup section 51 is capable of picking up an image changes according to the movement of the first arm. The first image pickup section 51 may pick up a still image of the range or may pick up a moving image of the range.

The first image pickup section 51 is communicably connected to the robot control apparatus 60 by a cable. Wired communication via the cable is performed according to a standard such as an Ethernet (registered trademark) or a USB. Note that the first image pickup section 51 may be connected to the robot control apparatus 60 by wireless communication performed according to a communication standard such as Wi-Fi (registered trademark).

The second arm includes a second end effector E2 and a second manipulator M2.

In this example, the second end effector E2 is an end effector including claw sections capable of gripping an object. Note that the second end effector E2 may be another end effector such as an end effector including an electric driver instead of the end effector including the claw sections.

The second end effector E2 is communicably connected to the robot control apparatus 60 by a cable. Consequently, the second end effector E2 performs operation based on a control signal acquired from the robot control apparatus 60. Note that wired communication via the cable is performed according to a standard such as an Ethernet (registered trademark) or a USB. The second end effector E2 may be connected to the robot control apparatus 60 by wireless communication performed according to a communication standard such as Wi-Fi (registered trademark).

The second manipulator M2 includes seven joints and a second image pickup section 52. The seven joints respectively include not-shown actuators. That is, the second arm including the second manipulator M2 is an arm of the seven-axis vertical multi-joint type. The second arm performs operation of a degree of freedom of seven axes through a cooperated operation of the supporting table, the second end effector E2, the second manipulator M2, and the actuators of the respective seven joints included in the second manipulator M2. Note that the second arm may operate at a degree of freedom of six axes or less or may operate at a degree of freedom of eight axes or more.

When the second arm operates at the degree of freedom of seven axes, the second arm can take more postures compared with when operating at the degree of freedom of six axes or less. Consequently, the second arm smoothly operates and can easily avoid interference with an object present around the second arm. When the second arm operates at the degree of freedom of seven axes, the second arm is easily controlled with small computational complexity compared with when the second arm operates at the degree of freedom of eight axes or more.

The seven actuators (included in the seven joints) included in the second manipulator M2 are respectively communicably connected to the robot control apparatus 60 by cables. Consequently, the actuators actuate the second manipulator M2 on the basis of a control signal acquired from the robot control apparatus 60. Note that wired communication via the cables is performed according to a standard such as an Ethernet (registered trademark) or a USB. A part or all of the seven actuators included in the second manipulator M2 may be connected to the robot control apparatus 60 by wireless communication performed according to a communication standard such as Wi-Fi (registered trademark).

The second image pickup section 52 is a camera including, for example, a CCD or a CMOS, which is an image pickup device that converts collected light into an electric signal. In this example, the second image pickup section 52 is included in a part of the second manipulator M2. Therefore, the second image pickup section 52 moves according to the movement of the second arm. A range in which the second image pickup section 52 is capable of picking up an image changes according to the movement of the second arm. The second image pickup section 52 may pick up a still image of the range or may pick up a moving image of the range.

The second image pickup section 52 is communicably connected to the robot control apparatus 60 by a cable. Wired communication via the cable is performed according to a standard such as an Ethernet (registered trademark) or a USB. Note that the second image pickup section 52 may be connected to the robot control apparatus 60 by wireless communication performed according to a communication standard such as Wi-Fi (registered trademark).

The robot 50 includes a third image pickup section 53 and a fourth image pickup section 54.

The third image pickup section 53 is a camera including, for example, a CCD or a CMOS, which is an image pickup device that converts collected light into an electric signal. The third image pickup section 53 is included in a part where the third image pickup section 53 is capable of performing, in conjunction with the fourth image pickup section 54, stereo image pickup of a range in which the fourth image pickup section 54 is capable of picking up an image. The third image pickup section 53 is communicably connected to the robot control apparatus 60 by a cable. Wired communication via the cable is performed according to a standard such as an Ethernet (registered trademark) or a USB. Note that the third image pickup section 53 may be connected to the robot control apparatus 60 by wireless communication performed according to a communication standard such as Wi-Fi (registered trademark).

The fourth image pickup section 54 is a camera including, for example, a CCD or a CMOS, which is an image pickup device that converts collected light into an electric signal. The fourth image pickup section 54 is included in a part where the fourth image pickup section 54 is capable of performing, in conjunction with the third image pickup section 53, stereo image pickup of a range in which the third image pickup section 53 is capable of picking up an image. The fourth image pickup section 54 is communicably connected to the robot control apparatus 60 by a cable. Wired communication via the cable is performed according to a standard such as an Ethernet (registered trademark) or a USB. Note that the fourth image pickup section 54 may be connected to the robot control apparatus 60 by wireless communication performed according to a communication standard such as Wi-Fi (registered trademark).

In this example, the functional sections included in the robot 50 explained above acquire control signals from the robot control apparatus 60 incorporated in the robot 50. The functional sections perform operations based on the acquired control signals. Note that the robot 50 may be controlled by the robot control apparatus 60 set on the outside instead of incorporating the robot control apparatus 60. In this case, the robot 50 and the robot control apparatus 60 configure a robot system. The robot 50 does not have to include a part of the first image pickup section 51, the second image pickup section 52, the third image pickup section 53, and the fourth image pickup section 54.

The robot control apparatus 60 actuates the robot 50 by transmitting a control signal to the robot 50. Consequently, the robot control apparatus 60 causes the robot 50 to perform predetermined work.

Note that a part of all of the first image pickup section 51, the second image pickup section 52, the third image pickup section 53, and the fourth image pickup section 54 may be image pickup sections separate from the robot 50. In this case, the robot 50, the image pickup sections separate from the robot 50, and the robot control apparatus 60 configure a robot system.

Hardware Configuration of the Robot Control Apparatus 60

The hardware configuration of the robot control apparatus 60 is explained below. Note that FIG. 12 showing an example of the hardware configuration of the robot control apparatus 60 is the same as a figure in which only the signs denoting the components of the example of the hardware configuration of the image processing apparatus 20 shown in FIG. 2 are changed. The robot control apparatus 60 includes, for example, a storing section 61, an input receiving section 63, a communication section, and a display section 65. The robot control apparatus 60 performs communication with the robot 50 via the communication section. These components are communicably connected to one another via the bus Bus.

The CPU 21 executes various computer programs stored in the storing section 61.

The storing section 61 includes, for example, a HDD, an SSD, an EEPROM, a ROM, and a RAM. Note that the storing section 61 may be an external storage device connected by, for example, a digital input/output port such as a USB instead of a storage device incorporated in the robot control apparatus 60. The storing section 61 stores various kinds of information and images processed by the robot control apparatus 60, computer programs, information indicating the position of a not-shown material supply region, and the like.

The input receiving section 63 is a teaching pendant including, for example, a keyboard, a mouse, and a touch pad or another input device. Note that the input receiving section 63 may be configured integrally with the display section 65 as a touch panel.

The communication section includes, for example, a digital input/output port such as a USB and an Ethernet (registered trademark) port.

The display section 65 is, for example, a liquid crystal display panel or an organic EL (Electro Luminescence) display panel.

Functional Configuration of the Robot Control Apparatus

The functional configuration of the robot control apparatus 60 is explained below with reference to FIG. 12. FIG. 12 is a diagram showing an example of the functional configuration of the robot control apparatus 60. The robot control apparatus 60 includes the storing section 61, the input receiving section 63, the display section 65, an image acquiring section 67, and a control section 68.

The image acquiring section 67 acquires, from the first image pickup section 51, a picked-up image picked up by the first image pickup section 51. The image acquiring section 67 acquires, from the second image pickup section 52, a picked-up image picked up by the second image pickup section 52. The image acquiring section 67 acquires, from the third image pickup section 53, a picked-up image picked up by the third image pickup section 53. The image acquiring section 67 acquires, from the fourth image pickup section 54, a picked-up image picked up by the fourth image picked section 54.

The control section 68 controls the entire robot control apparatus 60. The control section 68 includes an image-pickup control section 31a, the display control section 33, the second-image-processing-information generating section 37, the second-image-processing-information editing section 39, the image-processing executing section 43, and a robot control section 45. The functional sections included in the control section 68 are realized by, for example, the CPU 21 executing various kinds of computer programs stored in the storing section 61. A part or all of the functional sections may be hardware functional sections such as an LSI (Large Scale Integration) and an ASIC (Application Specific Integrated Circuit).

The image-pickup control section 31a causes any one of the first image pickup section 51, the second image pickup section 52, the third image pickup section 53, and the fourth image pickup section 54 to pick up an image of an image pickup range including the target object O. In the following explanation, as an example, the image-pickup control section 31a causes the third image pickup section 53 to pick up an image of the image pickup range.

The robot control section 45 actuates the robot 50 on the basis of a result of image processing performed by the image-processing executing section 43 on a picked-up image acquired from the third image pickup section 53 by the image acquiring section 67. For example, the result of the image processing performed by the image-processing executing section 43 is a result obtained by calculating a position in a robot coordinate system of the center of gravity of the target object O included in the picked-up image. In this case, the robot control section 45 causes, on the basis of the position, the first arm or the second arm to grasp the target object O.

In this way, the robot control apparatus 60 includes a part of the functional sections included in the image processing apparatus 20. Consequently, the robot 50 can obtain effects same as the effects in the embodiment. That is, with the robot control apparatus 60 included in the robot 50, even if the user does not have expert knowledge concerning image processing necessary for causing the robot 50 to perform predetermined work, the user can easily select, on the basis of instance information, an instance in which desired image processing is performed. As a result, the user can easily perform the desired image processing with the robot control apparatus 60 and easily cause the robot 50 to perform the predetermined work.

With the robot control apparatus 60 included in the robot 50, the user can select instance information and execute a plurality of tools configuring an instance indicated by the selected instance information. Therefore, every time the user attempts to perform image processing necessary for causing the robot 50 to perform the predetermined work, the user does not have to select again tool information indicating a tool corresponding to the image processing. It is possible to achieve efficiency of work concerning the image processing.

Note that, in the modification of the embodiment, the robot control apparatus 60 includes a part of the functional sections included in the image processing apparatus 20. However, the robot 50 may include the robot control apparatus 60 and the image processing apparatus 20 as separate bodies. In this case, the robot control apparatus 60 and the image processing apparatus 20 are communicably connected to each other by wire or radio. In this case, the robot 50, the robot control apparatus 60, and the image processing apparatus 20 configure a robot system. The robot control apparatus 60 causes, via the image processing apparatus 20, the third image pickup section 53 to pick up an image of the image pickup range, causes the image processing apparatus 20 to perform image processing based on the picked-up image, and acquires a result of the image processing from the image processing apparatus 20. The robot control apparatus 60 causes, on the basis of the acquired result of the image processing, the robot 50 to perform the predetermined work.

In the modification of the embodiment, the robot control apparatus 60 includes a part of the functional sections included in the image processing apparatus 20. However, the robot 50 may include, instead of the robot control apparatus 60, the image processing apparatus 20 including a part of the functional sections of the robot control apparatus 60. In this case, the image processing apparatus 20 may be incorporated in the robot 50 or may be included in the robot system together with the robot 50 as a separate body from the robot 50. The image processing apparatus 20 causes the third image pickup section 53 to pick up an image of the image pickup range, performs image processing based on the picked-up image, and causes, on the basis of a result of the image processing, the robot 50 to perform the predetermined work.

As explained above, the image processing apparatus 20 (or the robot 50 or the robot system explained above) in the embodiment receives operation from the user, selects, on the basis of the received operation, second image processing information (in this example, the instance information), which is information indicating second image processing (in this example, the instance) configured by a plurality of kinds of first image processing (in this example, the tools), and performs editing of the plurality of kinds of first image processing configuring the second image processing indicated by the second image processing information. Consequently, the image processing apparatus 20 can easily perform image processing desired by the user.

The image processing apparatus 20 is capable of causing a display section (in this example, the display section 25 or the display section 65) to display a plurality of kinds of second image processing information and selecting second image processing information from the displayed plurality of kinds of second image processing information. Consequently, the image processing apparatus 20 can easily perform, on the basis of the selected second image processing information, image processing desired by the user.

The image processing apparatus 20 performs, on the basis of operation received from the user, as the editing of the plurality of kinds of first image processing configuring the second image processing indicated by the second image processing information, addition or deletion of first image processing information (in this example, the tool information) indicating first image processing configuring the second image processing indicated by the second image processing information. Consequently, the image processing apparatus 20 can change the second image processing to image processing desired by the user.

In the image processing apparatus 20, the user is capable of inputting parameters used in execution of the first image processing based on the first image processing information. Consequently, the image processing apparatus 20 can easily perform, on the basis of the input parameters, image processing desired by the user.

The image processing apparatus 20 selects two or more kinds of first image processing information on the basis of operation received from the user and generates the second image processing information on the basis of the selected first image processing information. Consequently, the image processing apparatus 20 can easily perform, on the basis of the generated second image processing information, image processing desired by the user.

Second Embodiment

Overview of an Image Processing Apparatus

Figure 13:
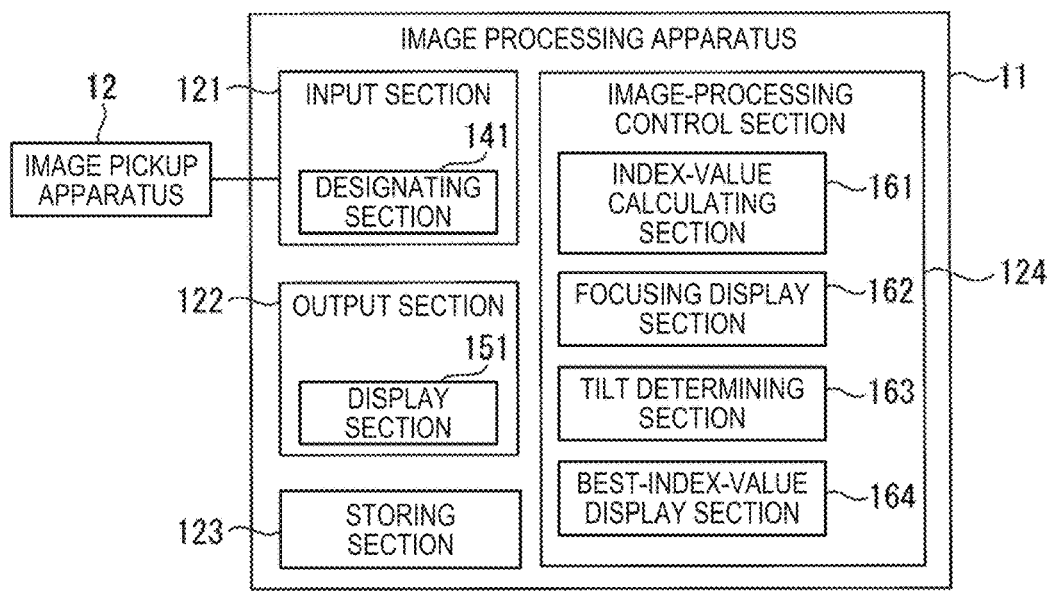
FIG. 13 is a diagram showing a schematic configuration example of an image processing apparatus according to a second embodiment of the invention.

FIG. 13 is a diagram showing a schematic configuration example of an image processing apparatus 11 according to a second embodiment of the invention. An image pickup apparatus 12 connected to the image processing apparatus 11 is also shown in FIG. 13.

The image processing apparatus 11 includes an input section 121, an output section 122, a storing section 123, and an image-processing control section 124.

The input section 121 includes a designating section 141.
The output section 122 includes a display section 151.
The image-processing control section 124 includes an index-value calculating section 161, a focusing display section 162, a tilt determining section 163, and a best-index-value display section 164.

Information is input to the input section 121. As an example, the input section 121 may include an operation section. Information corresponding to operation performed by a user on the operation section may be input to the input section 121. As another example, the input section 121 may receive information transmitted from an external apparatus to thereby receive input of the information. In this embodiment, data of an image picked up by the image pickup apparatus 12 is input to the input section 121.

Information corresponding to designation performed by the user is input to the designating section 141. The designating section 141 designates a portion of an image (a part of the image). The function of the designating section 141 may be included in the function of inputting information with the operation section.

The output section 122 outputs information. As an example, the output section 122 may output information to the user. As another example, the output section 122 may transmit information to an external apparatus to thereby output the information.

The display section 151 includes a screen (a display screen) and displays information on the screen to output the information to the user.

Note that the output section 122 may include a speaker that outputs information as sound and output the information with the speaker.

The storing section 123 stores information.
The storing section 123 stores a control program, parameters, and the like to be used by the image-processing control section 124.

The storing section 123 stores information (image data) concerning a plurality of images and information concerning image processing.

Note that the storing section 123 may store any other information.

The image-processing control section 124 includes a CPU (Central Processing Unit) and executes, with the CPU, the control program stored in the storing section 123 to thereby perform various kinds of processing. In this case, the CPU may use the parameters and the like stored in the storing section 123.

The index-value calculating section 161 calculates an index value about information concerning an image.

The focusing display section 162 displays, concerning a portion of the image, on the basis of the calculated index value, information concerning presence or absence of focusing.

The tilt determining section 163 determines presence or absence of a tilt on the basis of presence or absence of focusing in a plurality of portions of the image.

When a focus ring or the like of the image pickup apparatus 12 is manually adjusted by the user, the best-index-value display section 164 displays, on the display section 151, an index value representing a highest degree of focusing (in this embodiment, the highest degree of focusing is referred to as best).

In this embodiment, the image pickup apparatus 12 that picks up an image and the image processing apparatus 11 that processes information concerning the image picked up by the image pickup apparatus 12 are configured as separate bodies. However, as another configuration example, the function of the image processing apparatus 11 may be integrally incorporated in the image pickup apparatus 12.

Index Value

An index value used in this embodiment is explained with reference to FIGS. 14 to 20. In this embodiment, the index-value calculating section 161 calculates an index value.

In this embodiment, an index value capable of independently determining whether an image is focused is used. The index value is not a relative index value and is an absolute index value. The absolute index value does not depend on, for example, a change in brightness of each of images and is effective for different images.

In this embodiment, a value called blur width is used as the index value. The blur width is an average of widths (edge widths) of contour lines extracted by a fixed number in order from the width having the highest contrast in a target region of an image. The blur width is a value in pixel units.

In this embodiment, width equivalent to 20% to 80% of contrast is used as the edge width. However, as another configuration example, width equivalent to another percentage (%) may be used. For example, width equivalent to 10% to 90% of the contrast may be used as the edge width. Alternatively, width equivalent to 30% to 70% of the contrast may be used. Other widths may be used.

In this embodiment, as an index value of one pixel, local blur width (edge width) in the pixel is used.

In this embodiment, as an index value of a predetermined region, blur width (statistical blur width) statistically calculated using a plurality of local blur widths (edge widths) in the predetermined region is used.

First, local blur width (an index value of one pixel in this embodiment) in an image is explained with reference to FIGS. 14 to 16.

When scanning an entire processing target image and detecting a gradient of luminance, the index-value calculating section 161 traces the image in a gradient direction from a place where the gradient is detected and detects and extracts local blur width (edge width). Note that, at this point, a contour is extracted.

Figure 14:
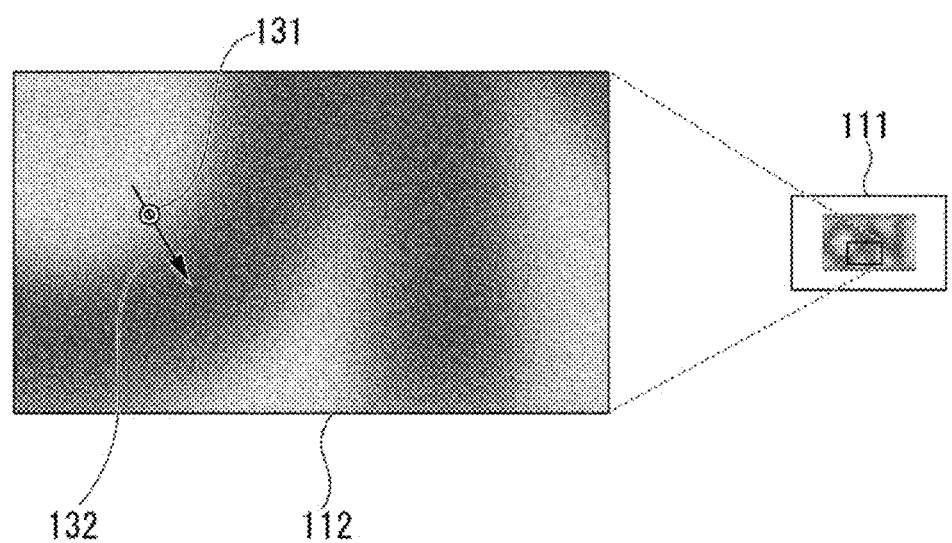
FIG. 14 is a diagram showing an example of an image picked up by an image pickup apparatus.

FIG. 14 is a diagram showing an example of an image 111 picked up by the image pickup apparatus 12.

In FIG. 14, an enlarged image of a part of the image 111 (an enlarged image 112) is shown. In the enlarged image 112, a position where the index-value calculating section 161 starts a search (a search start position 131) and a gradient direction 132 of luminance are shown. In this embodiment, the gradient direction is a direction from a high luminance (bright) side to a low luminance (dark) side. However, as another configuration example, the gradient direction may be a direction from the low luminance (dark) side to the high luminance (bright) side.

Figure 15:
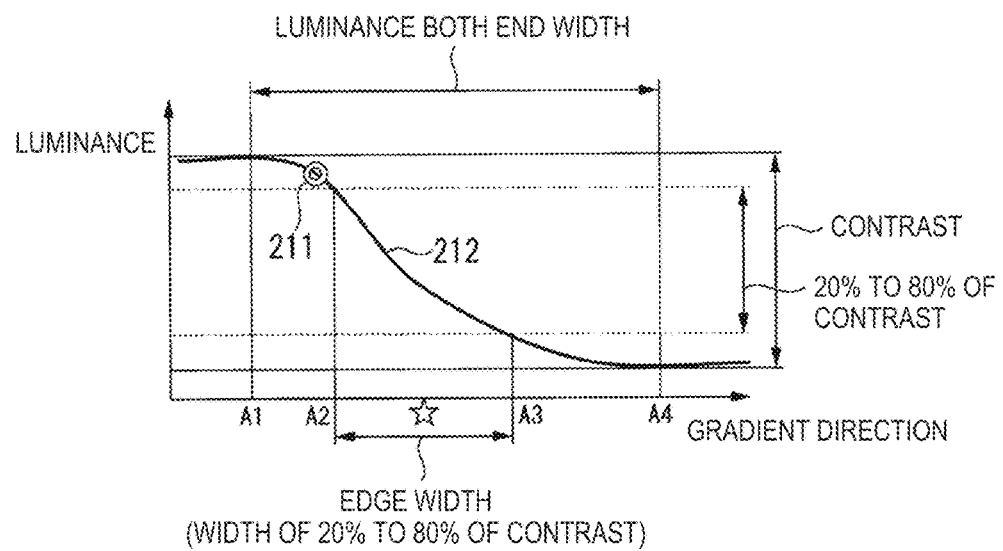
FIG. 15 is a diagram showing an example of a relation between a distance in a gradient direction and luminance.

FIG. 15 is a diagram showing an example of a relation between a distance in the gradient direction and luminance.

The distance in the gradient direction is determined on the basis of, for example, a maximum or a minimum of the luminance.

In a graph shown in FIG. 15, the horizontal axis represents the distance (length) in the gradient direction of the luminance and the vertical axis represents the luminance. Concerning one gradient direction (an example of the gradient direction 132 in FIG. 14) in a processing target image, a search start position 211 (an example of the search start position 131 in FIG. 14) and a characteristic 212 of the luminance are shown.

In this embodiment, the index-value calculating section 161 determines, in the characteristic 212 of the luminance, 20% to 80% of contrast on the basis of contrast between the maximum and the minimum of the luminance.

In FIG. 15, a distance A1 in which the luminance is the maximum, a distance A4 in which the luminance is the minimum, a distance A2 in which the luminance is 80% of the contrast, and a distance A3 in which the luminance is 20% of the contrast are shown. The length between the distance A1 and the distance A4 is equivalent to the width between both ends of the luminance (luminance both end width). The length between the distance A2 and the distance A3 is equivalent to the edge width in this embodiment. The position of the middle point between the distance A2 and the distance A3 is the position of the middle point of the edge width (an edge middle point position).

In this embodiment, the index-value calculating section 161 uses, as the search start position 211, a position where the luminance is equal to or larger than a predetermined threshold. For example, the threshold may be set in advance and stored in the storing section 123. The index-value calculating section 161 performs a search from the search start position 211 to positions where the luminance is flat or the gradient is inverted on both sides of the gradient of the luminance. Note that the search start position 211 may shift a little. If both the sides can be traced, the same search result is obtained.

Figure 16:
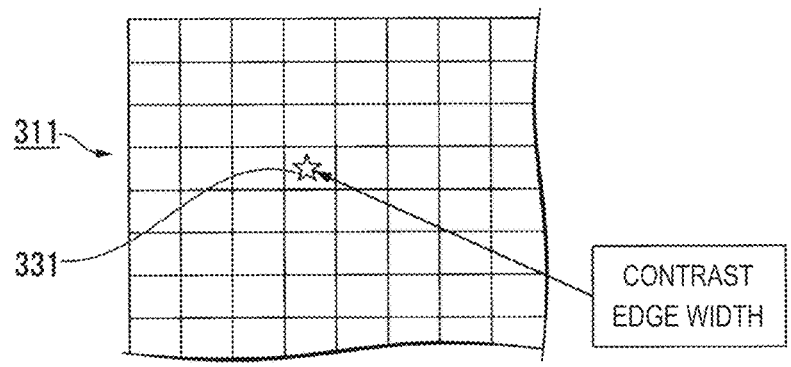
FIG. 16 is a diagram showing an example of an edge map.

FIG. 16 is a diagram showing an example of an edge map 311.

The index-value calculating section 161 generates the edge map 311 on the basis of a search result.

The edge map 311 is a table capable of storing (memorizing) predetermined information, for example, concerning positions of all pixels in a processing target image.

In this embodiment, the index-value calculating section 161 stores, in the edge map 311, information concerning edge width in association with the position of the middle point of the edge width (the edge middle point position 331). In this embodiment, as the information concerning the edge width, information concerning the edge width (itself) and information concerning contrast of the edge width are stored in the edge map 311.

The index-value calculating section 161 performs the search concerning all gradients of the luminance in the entire processing target image and stores information concerning the gradients in the edge map 311. Consequently, in the edge map 311, the information concerning the edge width is tabulated concerning the entire processing target image. In this embodiment, redundancy of the same information is eliminated in this processing.

Statistical blur width (an index value of a predetermined region in this embodiment) in an image is explained with reference to FIGS. 17 to 20.

Figure 17:
FIG. 17 is a diagram showing an example of a size of an image.

FIG. 17 is a diagram showing an example of a size of an image 411.

In this embodiment, an image having a size same as the size of the image 411 is set as a processing target. The image 411 is rectangular (or square). As the size of the image 411, lateral length (width) is W, longitudinal length (height) is H, and length of a diagonal line is L. W, H, and L are respectively represented by the numbers of pixels.

Figure 18:
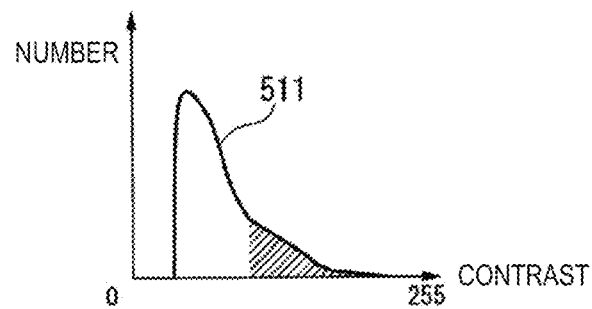
FIG. 18 is a diagram showing an example of a relation between contrast and a number concerning edge width.

FIG. 18 is a diagram showing, concerning edge width, an example of a relation between contrast and a number.

A graph shown in FIG. 18 is a graph concerning edge widths searched in the entire processing target image.

In the graph shown in FIG. 18, the horizontal axis represents contrast of edge width and the vertical axis represents the number of edge widths. A characteristic 511 of a relation between the contrast and the number is shown concerning the edge width. In this embodiment, a value of the luminance is 0 to 255 and the contrast is 0 to 255.

The index-value calculating section 161 extracts, out of obtained edge widths, information concerning a predetermined number of edge widths from the edge width having the highest contrast. In this embodiment, as the predetermined number, length (L pixels) of a diagonal line of the processing target image is used. As another configuration example, as the predetermined number, for example, lateral length (W pixels) of the processing target image may be used, longitudinal length (H pixels) of the processing target image may be used, a sum of the lengths ((W+H) pixels) may be used, or other length may be used.

In FIG. 18, an extracted portion is hatched in the characteristic 511.

Figure 19:
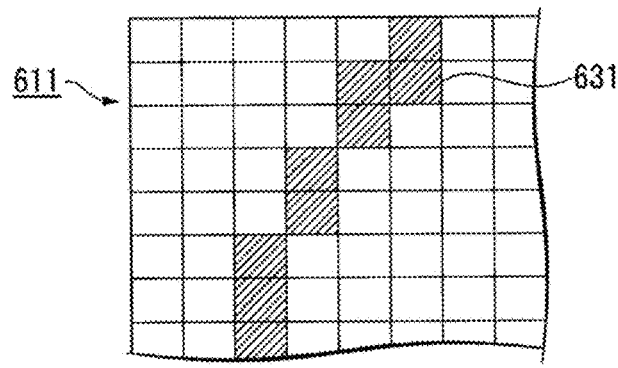
FIG. 19 is a diagram showing an example of a portion extracted in the edge map.

FIG. 19 is a diagram showing an example of a portion (an extracted portion 631) extracted in an edge map 611 (equivalent to the edge map 311 shown in FIG. 16).

In FIG. 19, the extracted portion 631 is hatched.

The index-value calculating section 161 calculates an average of extracted all edge widths (edge widths stored in an edge middle point position in the edge map 611). The index-value calculating section 161 sets a result of the calculation (the average) as blur width (statistical blur width) and uses the calculation result as an index value of focusing (an index value of a predetermined region) in this embodiment.

Figure 20:
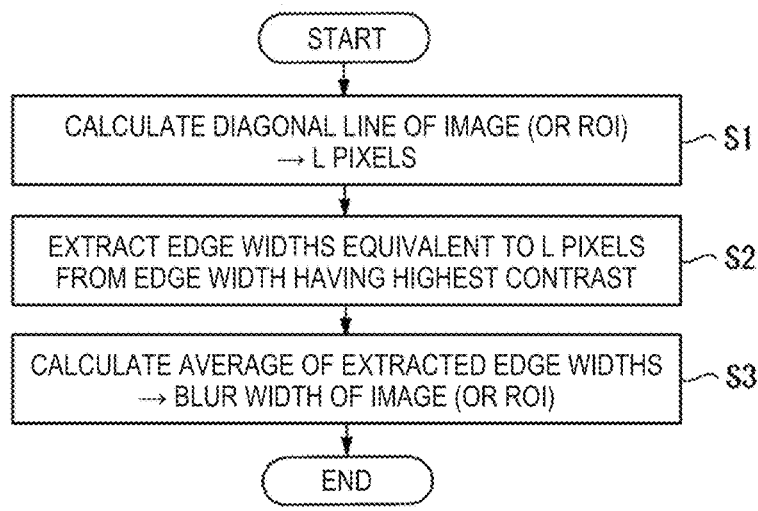
FIG. 20 is a flowchart for explaining an example of a procedure of processing for calculating blur width.

FIG. 20 is a flowchart for explaining an example of a procedure of processing for calculating blur width.

Note that, in the above explanation, the index-value calculating section 161 calculates blur width concerning the entire region of the processing target image. However, the index-value calculating section 161 may calculate blur width concerning apart of the region of the processing target image. Only the regions are different in the calculations. The blur width can be calculated by the same processing. In this embodiment, as an example of a part of the region of the processing target image, a region of interest (ROI) is used. The designating section 141 may designate the ROI according to, for example, an instruction of the user.

Step S1

The index-value calculating section 161 calculates length of the diagonal line (diagonal length) of the processing target image (or the ROI). In this embodiment, the diagonal length is L pixels.

Step S2

The index-value calculating section 161 extracts, on the basis of a search result of edge widths, edge widths equivalent to the L pixels in order from the edge width having the highest contrast.

Step S3

The index-value calculating section 161 calculates an average of the extracted edge widths. The average is used as blur width of the processing target image (or the ROI). In this embodiment, the average is used as an index value of focusing (an index value of a predetermined region).

In this embodiment, the information concerning the predetermined number of edge widths is extracted in order from the edge width having the highest contrast. However, as another configuration example, the information concerning the predetermined number of edge widths may be extracted in order from the edge width having the smallest blur width (edge width).

In this embodiment, the edge width is calculated assuming that the gradient of the luminance is a straight line (one tilt) in the contour line of the luminance. However, as another configuration example, the edge width may be calculated by connecting a plurality of very small gradients of the luminance in the contour line of the luminance. In this case, the edge width is a value (an integrated value) obtained by totaling the lengths of the very small gradients of the luminance from one end of an edge to the other end of the edge. The value is a value obtained by totaling, in the gradients of the luminance, lengths of the gradients from one end of an edge to the other end of the edge while tracing zigzags in the luminance gradient direction in positions of the gradients. In this embodiment, one end of the edge is a position where the contrast is 20% and the other end of the edge is a position where the contrast is 80%.

Note that, concerning the blur width, results of an evaluation test explained below are obtained by the applicant. The blur width is considered to be suitable as an index value of focusing.

(A result 1 of the evaluation test) The blur width from a largely defocused place to the vicinity of a focus monotonously decreases.

(A result 2 of the evaluation test) In the vicinity of the focus, there is a fixed correlation between reproduction of contrast of a high frequency and the blur with.

(A result 3 of the evaluation test) The blur width is hardly affected by noise.

(A result 4 of the evaluation test) In a half tone, the blur width hardly changes even if contrast is different.

(A result 5 of the evaluation test) Even if a target changes, the blur width can be used as an absolute index. Note that the blur width could include a fixed error. However, the error is in a degree practically not considered a problem.

Details of the Operation of the Image Processing Apparatus

Details of the operation of the image processing apparatus 11 are explained with reference to FIGS. 21 to 30.

Processing concerning determination of presence or absence of focusing and determination of presence or absence of a tilt is explained with reference to FIGS. 21 to 23.

Figure 21:
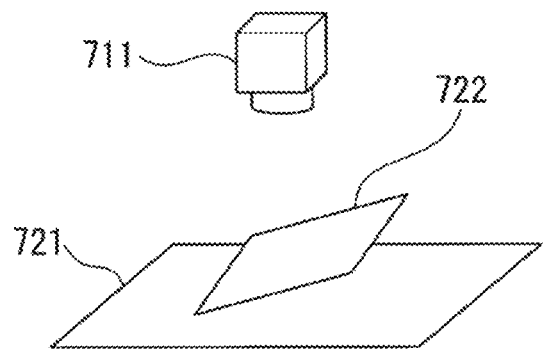
FIG. 21 is a diagram showing an example of disposition in image pickup.

FIG. 21 is a diagram showing an example of disposition for image pickup.

In FIG. 21, an image pickup apparatus 711 (an example of the image pickup apparatus 12 shown in FIG. 13), a surface (a parallel surface 721) parallel to an image pickup surface of the image pickup apparatus 711, and a target object 722 are shown. The parallel surface 721 is an imaginary surface for explanation and is not an object present in an actual space.

In the example shown in FIG. 21, the target object 722 having a planar shape is disposed nonparallel to the parallel surface 721 (nonparallel disposition).

Figure 22:
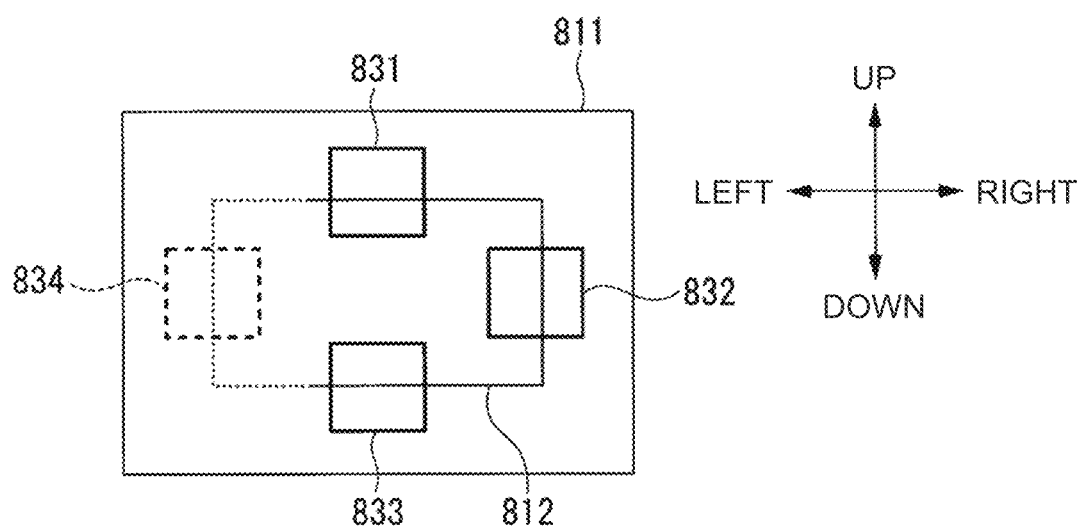
FIG. 22 is a diagram showing an example of display of presence or absence of focusing.

FIG. 22 is a diagram showing an example of display of presence or absence of focusing.

In FIG. 22, an example of an image 811 displayed on a screen of the display section 151 is shown. In the image 811, the focusing display section 162 displays presence or absence of focusing in an image picked up in the disposition of the example shown in FIG. 21.

An image 812 of a target object included in the image 811 is an image of the target object 722 shown in FIG. 21. In the example shown in FIG. 22, the right side is focused and the left side is not focused.

In the example shown in FIG. 22, the focusing display section 162 determines presence or absence of focusing concerning each of four frame regions (frame regions 831 to 834) (whether the frame region is focused) and displays information indicating a result of the determination. The frame regions 831 to 834 are regions of interest (ROIs) desired to be set as targets of inspection, measurement, or the like.

In the example shown in FIG. 22, the focusing display section 162 differentiates a line type (e.g., a solid line) of the frames of the focused frame regions 831 to 833 and a line type (e.g., a dotted line) of the frame of the unfocused frame region 834 and displays the frame regions to distinguish and display presence or absence of focusing.

Note that another configuration may be used to distinguish and display presence or absence of focusing. As an example, the focusing display section 162 may differentiate a color (e.g., green) of the frames or the insides of the focused frame regions 831 to 833 and a color (e.g., red) of the frame or the inside of the unfocused frame region 834 and display the frame regions to distinguish and display presence or absence of focusing. As another example, the focusing display section 162 may differentiate a pattern of the frames or the insides of the focused frame regions 831 to 833 and a pattern of the frame or the inside of the unfocused frame region 834 and display the frame regions to distinguish and display presence or absence of focusing. As another example, the focusing display section 162 may distinguish and display presence or absence of focusing concerning the frame regions 831 to 834 using characters, numbers, signs, or the like.

When index values calculated by the index-value calculating section 161 concerning the frame regions 831 to 834 are satisfactory compared with a predetermined threshold, the focusing display section 162 determines that the frame regions 831 to 834 are focused (focusing is present). When the index values are not satisfactory compared with the threshold, the focusing display section 162 determines that the frame regions 831 to 834 are not focused (focusing is absent). In this case, the index-value calculating section 161 sets the frame regions 831 to 834 as ROIs and calculates an index value for each of the frame regions 831 to 834. For example, the threshold may be set in advance and stored in the storing section 123.

In this embodiment, blur width is used as an index value. A smaller index value is satisfactory in terms of focusing. A larger index value is not satisfactory in terms of focusing.

In the example shown in FIG. 22, with respect to the image 812 of the target object, the frame region 831 is set on the upper side and in the vicinity of the horizontal center, the frame region 832 is set on the right side and in the vicinity of the vertical center, the frame region 833 is set on the lower side and in the vicinity of the horizontal center, and the frame region 834 is set on the left side and in the vicinity of the vertical center. The frame regions 831 to 834 are respectively disposed in positions including the inside and the outside across the sides of the image 812 of the target object.

Note that, as an example, the frame regions 831 to 834 may be set in advance and stored in the storing section 123. As another example, the designating section 141 may designate the frame regions 831 to 834 according to, for example, an instruction of the user.

In the example shown in FIG. 22, the four frame regions 831 to 834 are shown in one image 811. However, the number of frame regions shown in one image may be any number equal to or larger than one. For example, the designating section 141 may designate the number of frame regions according to, for example, an instruction of the user.

The tilt determining section 163 determines presence or absence of a tilt on the basis of the result of the determination of presence of absence of focusing by the focusing display section 162. In this embodiment, the tilt determining section 163 determines presence or absence of a tilt of the target object (whether the target object tilts) concerning the image 812 of the target object included in the processing target image 811. In this embodiment, when all of the two or more regions (in the example shown in FIG. 22, the frame regions 831 to 834) set for the target object are focused, the tilt determining section 163 determines that the target object does not tilt. On the other hand, when one or more regions are not focused, the tilt determining section 163 determines that the target object tilts. Note that, in this embodiment, when all the regions are not focused, the tilt determining section 163 determines that the target object tilts. However, another configuration may be used.

In the example shown in FIG. 22, with respect to the target object, the frame region 831 on the upper side, the frame region 832 on the right side, and the frame region 833 on the lower side are focused and the frame region 834 on the left side is not focused. On the basis of this, the tilt determining section 163 determines that the object tilts.

The tilt determining section 163 displays, on the screen of the display section 151, information indicating a determination result of presence or absence of a tilt.

For example, the tilt determining section 163 may differentiate a line type (e.g., a solid line) of a frame (a contour) of a target object having a tilt and a line type (e.g., a dotted line) of a frame (a contour) of a target object not having a tilt and display the target objects to distinguish and display presence or absence of a tilt.

Note that a configuration for distinguishing and displaying presence or absence of a tilt, another configuration may be used. As an example, the tilt determining section 163 may differentiate a color (e.g., yellow) of the frame (the contour) or the inside of the target object having a tilt and a color (e.g., blue) of the frame (the contour) or the inside of the target object not having a tilt and display the target objects to distinguish and display presence of absence of a tilt. As another example, the tilt determining section 163 may differentiate a pattern of the frame (the contour) or the inside of the target object having a tilt and a pattern of the frame (the contour) or the inside of the target object not having a tilt and display the target objects to distinguish and display presence of absence of a tilt. As another example, the tilt determining section 163 may display a frame including all the regions (in the example shown in FIG. 22, a frame surrounding the four frame regions 831 to 834; not shown in the figure) when a tilt is absent and, on the other hand, does not display the frame when a tilt is present to distinguish and display presence or absence of a tilt. As another example, the tilt determining section 163 may distinguish and display presence or absence of a tilt of the target object using characters, numbers, signs, or the like.

Figure 23:
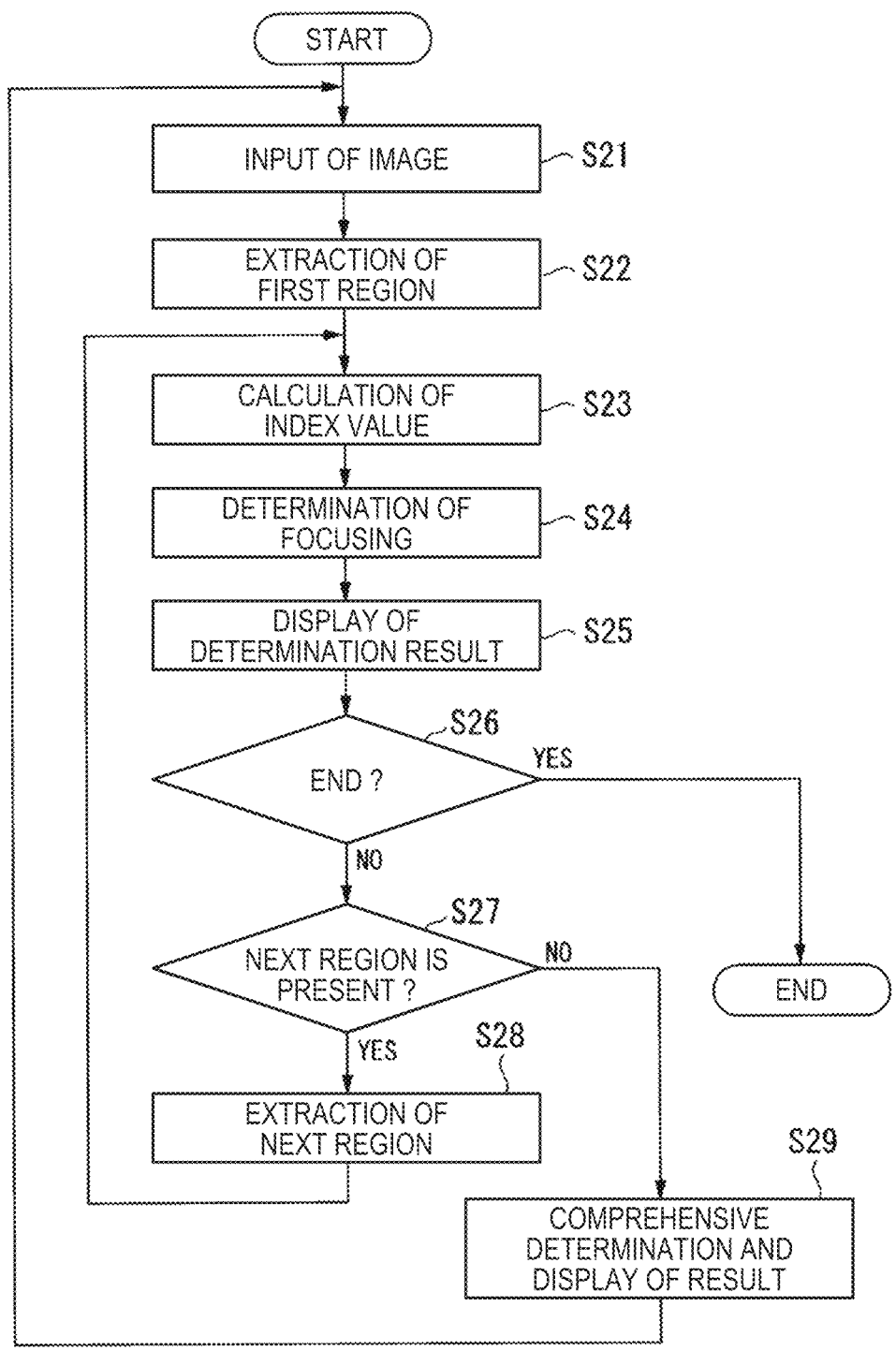
FIG. 23 is a flowchart for explaining an example of a procedure of processing for displaying presence or absence of focusing and processing for determining a tilt.

FIG. 23 is a flowchart for explaining an example of a procedure of processing for displaying presence or absence of focusing and processing for determining a tilt.

The image processing apparatus 11 performs processing in steps S21 to S29.

Step S21

Information concerning an image picked up by the image pickup device 12 is input to the input section 121.

Step S22

The index-value calculating section 161 and the focusing display section 162 extract and acquire, about the input information concerning the image, information concerning a region (in the example shown in FIG. 22, any one of the frame regions 831 to 834) set as a target for which an index value is calculated first. Note that, for example, the region may be set in advance or may be designated by the designating section 141.

Step S23

The index-value calculating section 161 calculates an index value concerning a target region (in this example, one region set as a target at the present point in time) for which the index value is calculated.

Step S24

The focusing display section 162 determines presence or absence of focusing on the basis of the index value calculated by the index-value calculating section 161.

Step S25

The focusing display section 162 displays, concerning the target region, a result of the determination of presence of absence of focusing (in the example shown in FIG. 22, information concerning the target frame region) on the screen of the display section 151.

Step S26

In this example, the image-processing control section 124 (e.g., the focusing display section 162) determines whether an end instruction corresponding to operation performed by the user is input by the input section 121.

As a result of the determination, when determining that the end instruction is input, the image-processing control section 124 (e.g., the focusing display section 162) ends the processing (YES in step S26). On the other hand, as a result of the determination, when determining that the end instruction is not input, the image-processing control section 124

(e.g., the focusing display section 162) shifts to processing in step S27 (NO in step S26).

Note that the processing in step S26 may be provided in another part in the flow.

Step S27

The focusing display section 162 determines whether a region set as a target for which an index value is calculated next is present.

As a result of the determination, when determining that a region set as a target for which an index value is calculated next is present, the focusing display section 162 shifts to processing in step S28 (YES in step S27). On the other hand, as a result of the determination, when determining that a region set as a target for which an index value is calculated next is absent, the focusing display section 162 shifts to processing in step S29 (NO in step S27).

In this embodiment, when the number of regions set as targets for which index values are calculated (in the example shown in FIG. 22, four, which the number of frame regions 831 to 834) is set, at a point in time when index values are calculated concerning the regions, the focusing display section 162 determines that a region set as a target for which an index value is calculated next is absent. For example, the number may be set in advance or may be designated by the designating section 141 and set.

As another configuration example, the focusing display section 162 may determine, according to an instruction corresponding to operation performed by the user (an instruction of the user input by the input section 121) corresponding to operation performed by the user, whether a region set as a target for which an index value is calculated next is present.

Step S28

The index-value calculating section 161 and the focusing display section 162 extract and acquire, about the input information concerning the image, information concerning a region set as a target for which an index value is calculated. The image processing apparatus 11 sets the region as a target and shifts to processing in step S23.

Step S29

As comprehensive determination, the tilt determining section 163 determines presence or absence of a tilt on the basis of a result of the determination of presence or absence of focusing by the focusing display section 162. The tilt determining section 163 displays information indicating the result of the determination on the screen of the display section 151. The image processing apparatus 11 shifts to processing in step S21. In this embodiment, the tilt determining section 163 determines, concerning a target object included in an image corresponding to the input information concerning the image, presence or absence of a tilt (whether the target object tilts).

In this embodiment, when the tilt determining section 163 determines that a tilt is present, processing for changing disposition for image pickup (in the example shown in FIG. 21, disposition of, for example, tilts of the image pickup apparatus 711 and the target object 722) is performed until the tilt determining section 163 determines that a tilt is absent. The processing for the change may be performed by, for example, control set in advance executed by the image processing apparatus 11 or another apparatus or may be manually performed by the user. As the change of the disposition for image pickup, for example, the position or the posture of the image pickup apparatus 711 itself or the target object 722 itself may be changed or the position or the posture of an optical system element (a lens, etc.) on the inside of the image pickup apparatus 711 may be changed.

In this embodiment, when the tilt determining section 163 determines that a tilt is present, the disposition for image pickup is regarded as impermissible (NG). When the tilt determining section 163 determines that a tilt is absent, the disposition for image pickup is permitted (OK).

Note that, for example, when presence or absence of focusing is determined for only one region, a configuration may be used in which a condition at the time when it is difficult or impossible to determine a tilt is set in advance and the tilt determining section 163 does not determine a tilt when the condition is satisfied.

In the example shown in FIG. 22, the image processing apparatus 11 acquires one image 811 and performs processing for setting the four frame regions 831 to 834 for the image 812 of the target object included in the image 811, determining and displaying presence of absence of focusing concerning the frame regions 831 to 834, and determining and displaying presence of absence of a tilt of the target object on the basis of a result of the determination. Thereafter, the image processing apparatus 11 acquires the next image and performs the same processing. The image processing apparatus 11 repeats the acquisition of an image and the processing.

A state in which presence or absence of focusing changes according to the disposition for image pickup is explained with reference to FIGS. 24 to 28.

Figure 24:
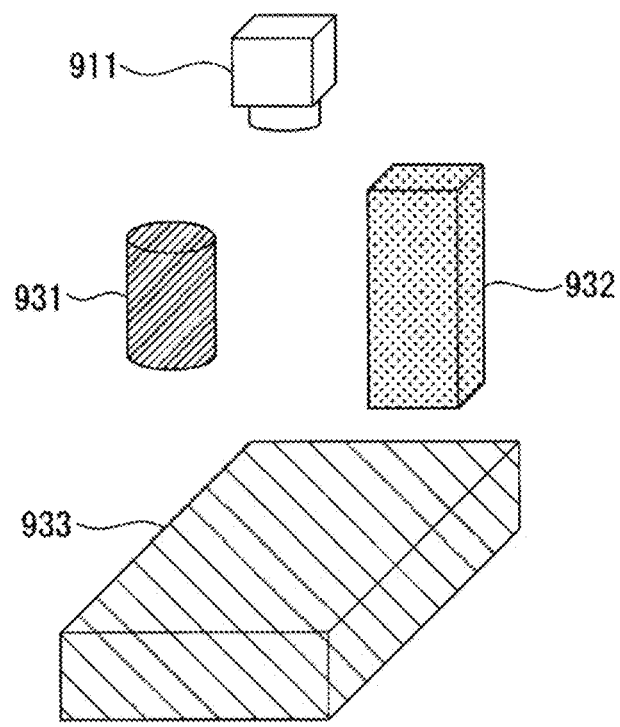
FIG. 24 is a diagram showing another example of the disposition in the image pickup.

FIG. 24 is a diagram showing another example of the disposition for image pickup.

In FIG. 24, an image pickup apparatus 911 (an example of the image pickup apparatus 12 shown in FIG. 13) and three different target objects 931 to 933 are shown.

In the example shown in FIG. 24, distances of the target objects 931 to 933 to an image pickup surface of the image pickup apparatus 911 (in the example shown in FIG. 24, heights from a table on which the target object 931 is placed) are different from one another.

Figure 25:
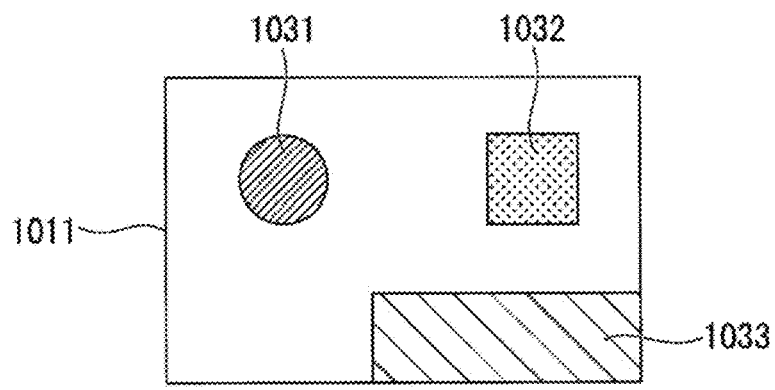
FIG. 25 is a diagram showing an example of disposition of an image of a target object in an image picked up by an image pickup apparatus.

FIG. 25 is a diagram showing an example of disposition of target object images 1031 to 1033 in an image 1011 picked up by the image pickup apparatus 911.

In the example shown in FIG. 25, the disposition of the target object images 1031 to 1033 is shown. Presence or absence of focusing is not shown. The target object image 1031, the target object image 1032, and the target object image 1033 are respectively images corresponding to the target object 931, the target object 932, and the target object 933 shown in FIG. 24.

In this example, since the distances of the target objects 931 to 933 to the image pickup surface of the image pickup apparatus 911 are different, presence or absence of focusing could be different concerning the target object images 1031 to 1033.

Figure 26:
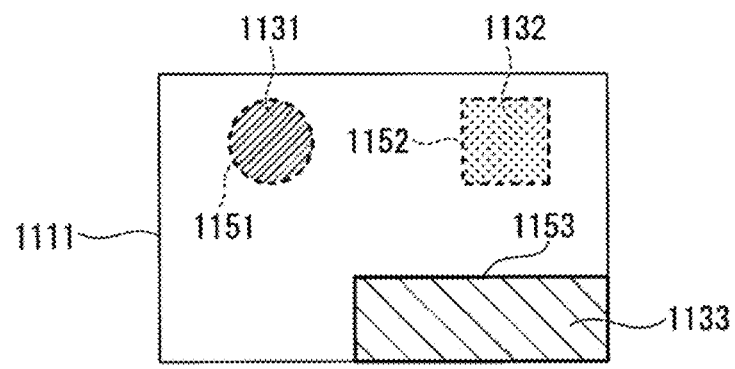
FIG. 26 is a diagram showing an example of display of presence or absence of focusing of each of pixels.
Figure 27:
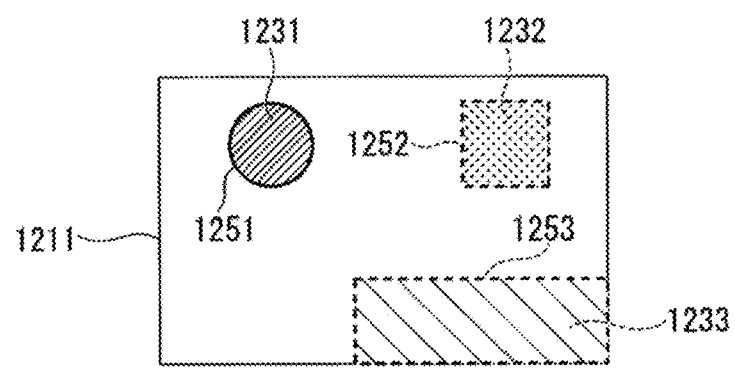
FIG. 27 is a diagram showing another example of the display of presence or absence of focusing of each of the pixels.
Figure 28:
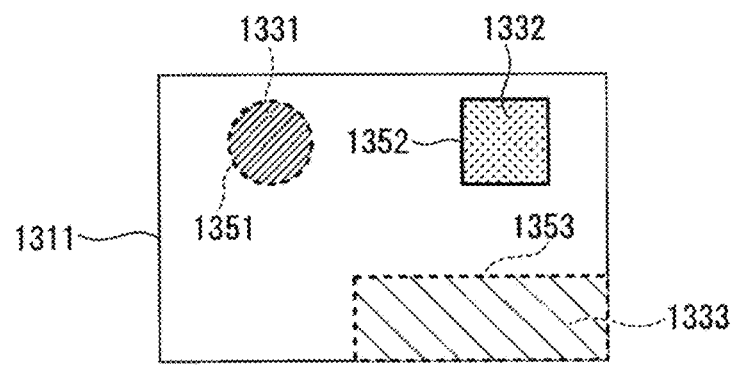
FIG. 28 is a diagram showing another example of the display of presence or absence of focusing of each of the pixels.

In FIGS. 26 to 28, in first disposition, second disposition, and third disposition, the disposition of the image pickup apparatus 911 and the target objects 931 to 933 (the disposition for image pickup) is different.

The first disposition, the second disposition, the third disposition, and other disposition are switched according to a change in the disposition for image pickup. For example, processing for the change may be performed according to control set in advance executed by the image processing apparatus 11 or another apparatus or may be manually performed by the user. As the change of the disposition for image pickup, for example, the position or the posture of the image pickup apparatus 911 itself or the target objects 931 to 933 themselves may be changed or the position or the posture of an optical system element (a lens, etc.) on the inside of the image pickup apparatus 911 may be changed.

FIG. 26 is a diagram showing an example of display of presence or absence of focusing of each of pixels.

In FIG. 26, an example of an image 1111 picked up by the image pickup apparatus 911 in the first disposition is shown. The image 1111 includes the target object image 1131, the target object image 1132, and the target object image 1133 respectively corresponding to the target object 931, the target object 932, and the target object 933 shown in FIG. 24.

In the example shown in FIG. 26, the index-value calculating section 161 and the focusing display section 162 set an entire region of the image 1111 as a region set as a target for which an index value is calculated. The index-value calculating section 161 calculates edge width (in this example, an index value of one pixel) for each of pixels. The focusing display section 162 determines presence or absence of focusing for each of the pixels in which edge widths are calculated and displays a result of the determination. As an example, the focusing display section 162 displays a focused pixel with a predetermined color (e.g., black), flashing, or the like to distinguish and display a focused pixel and an unfocused pixel. Note that, when the focused pixel and the unfocused pixel are distinguished by a color (the predetermined color), colors of the pixels could be the same depending on a color of an object, an image of which is picked up. However, the colors may be allowed if the pixels can be visually distinguished.

Schematically, in the example shown in FIG. 26, one target object image 1133 is focused and the other two target object images 1131 and 1132 are not focused. In the example shown in FIG. 26, a frame region 1153 configured from pixels corresponding to a contour of the focused target object and frame regions 1151 and 1152 configured from contours of the unfocused target objects are distinguished and shown by differentiating line types (e.g., a solid line and a dotted line) of frames.

In this embodiment, the edge middle point position 331 in the edge map 311 shown in FIG. 16 is used as the position of a pixel. Edge width stored in association with the edge middle point position 331 is used as edge width of the pixel (an index value of one pixel).

In this embodiment, the focusing display section 162 determines that, among all pixels for which edge widths are calculated in the entire region of the image 1111, pixels equal to or fewer than a predetermined number of pixels having higher contrasts are focused (focusing is present). The focusing display section 162 determines that the other pixels (pixels other than the pixels equal to or fewer than the predetermined number of pixels having higher contrasts) are not focused (focusing is absent). As the predetermined number of pixels having higher contrasts, L or the like explained with reference to FIGS. 17 to 19 may be used.

Note that, as a method of determining presence of absence of focusing of the pixels, another method may be used. As an example, concerning the pixels, the focusing display section 162 sets, as index values, edge widths calculated by the index-value calculating section 161. When the index values are satisfactory compared with a predetermined threshold, the focusing display section 162 may determine that the pixels are focused (focusing is present). When the index values are not satisfactory compared with the threshold, the focusing display section 162 may determine that the pixels are not focused (focusing is absent).

FIG. 27 is a diagram showing another example of the display of presence or absence of focusing of each of pixels.

In FIG. 27, an example of an image 1211 picked up by the image pickup apparatus 911 in the second disposition is shown. The image 1211 includes a target object image 1231, a target object image 1232, a target object image 1233 respectively corresponding to the target object 931, the target object 932, and the target object 933 shown in FIG. 24.

Schematically, in the example shown in FIG. 27, one target object image 1231 is focused and the other two target object images 1232 and 1233 are not focused.

Frame regions 1251 to 1253 of the target objects are the same as the frame regions in the example shown in FIG. 26.

FIG. 28 is a diagram showing another example of the display of presence or absence of focusing of each of pixels.

In FIG. 28, an example of an image 1311 picked up by the image pickup apparatus 911 in the third disposition is shown. The image 1311 includes a target object image 1331, a target object image 1332, and a target object image 1333 respectively corresponding to the target object 931, the target object 932, and the target object 933 shown in FIG. 24.

Schematically, in the example shown in FIG. 28, one target object image 1332 is focused and the other two target object images 1331 and 1333 are not focused.

Frame regions 1351 to 1353 of the target objects are the same as the frame regions in the example shown in FIG. 26.

Note that, in FIGS. 25 to 28, the entire images 1011, 1111, 1211, and 1311 picked up by the image pickup apparatus 911 are used as processing target images. However, as another configuration example, a part of an image picked up by the image pickup apparatus 911 may be used as a processing target image. For example, the part may be designated by the designating section 141.

Figure 29:
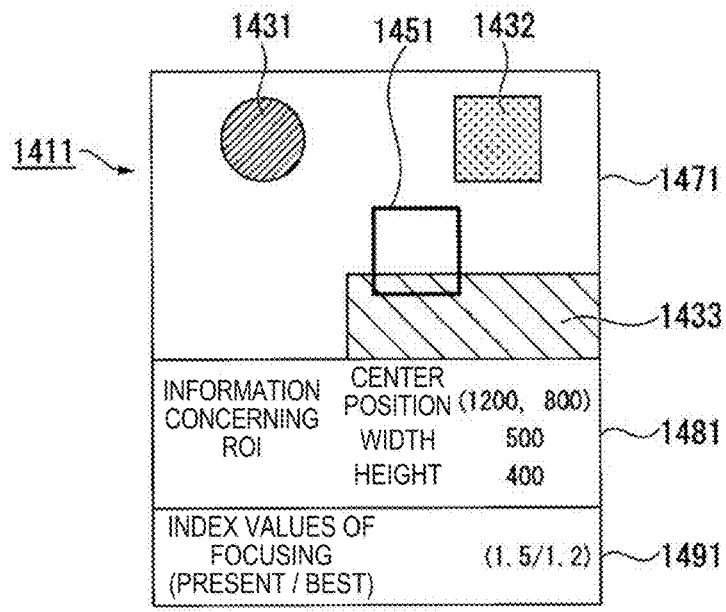
FIG. 29 is a diagram showing an example of screen display including display of an index value representing a highest degree of focusing.

FIG. 29 is a diagram showing an example of screen display including display of an index value representing a highest degree of focusing.

In FIG. 29, an example of display on a screen 1411 of the display section 151 is shown.

On the screen 1411, a region for displaying an image (an image display section 1471) is provided in an upper part, a region for displaying information concerning a frame region (a frame-region-information display section 1481) is provided in a middle stage, and a region for displaying an index value representing a highest degree of focusing (in this embodiment, referred to as best index value) (a best-index-value display section 1491) is provided in the lower part. Note that disposition of the plurality of display sections may be other disposition.

In the image display section 1471, an image picked up by an image pickup apparatus (e.g., the image pickup apparatus 911 shown in FIG. 24) and a frame region 1451 set in the image are superimposed and displayed. In the example shown in FIG. 29, the image includes images 1431 to 1433 of three different target objects (e.g., the target objects 931 to 933 shown in FIG. 24). The position of the frame region 1451 can be changed (moved) in the image according to, for example, an instruction of the user.

Information concerning the frame region 1451 set a target of inspection, measurement, or the like is displayed on the frame-region-information display section 1481. In the example shown in FIG. 29, an ROI is used as the frame region 1451. In the example shown in FIG. 29, as the information concerning the frame region 1451, information concerning the position of the center (the center position) of the frame region 1451, information concerning the lateral length (the width) of the frame region 1451, and information concerning the longitudinal length (the height) of the frame region 1451 are used. The center position is represented by a coordinate value of (a position in the lateral direction, a position in the longitudinal direction). The lengths are lengths in pixel units.

Note that the entire region of the image may be used as the frame region 1451.

A present index value and a best index value among index values obtained from a predetermined start point in the past to the present are displayed as index values of focusing on the belt-index-value display section 1491. In the example shown in FIG. 29, the respective index values are represented by numerical values. In the example shown in FIG. 29, the index values are displayed in a form of (the present index value/the best index value). In this embodiment, as an index value is more satisfactory, the index value is smaller. In the example shown in FIG. 29, the present index value is 1.5 and the best index value is 1.2. This indicates that disposition for image pickup more satisfactory compared with the present disposition for image pickup is present.

In this embodiment, the best-index-value display section 164 determines a best index value among index values calculated by the index-value calculating section 161 between a predetermined start point and a predetermined end point. The best-index-value display section 164 displays the present index value and the best index value on the screen of the display section 151 (in the example shown in FIG. 29, the best-index-value display section 1491 of the screen 1411). In this case, the index-value calculating section 161 or the best-index-value display section 164 stores the index values calculated by the index-value calculating section 161 in the storing section 123.

For example, the user manually continuously changes the disposition for image pickup to thereby cause the display section 151 to display index values in a plurality of kinds of disposition for image pickup and refers to the index values. The user adjusts the disposition for image pickup to set the present index value as the best index value. As an example, the user turns a focus ring included in the image pickup apparatus 911 to perform adjustment such that the present index value gradually decreases from a large value (a value indicating unfocusing) and thereafter gradually increases exceeding a minimum (a value indicating focusing) and then changes to the minimum. As the change of the disposition for image pickup, for example, the position or the posture of the image pickup apparatus 911 itself or the target objects 931 to 933 themselves may be changed or the position or the posture of an optical system element (a lens, etc.) on the inside of the image pickup apparatus 911 may be changed.

A period for determining the best index value is a period from a predetermined start point to a predetermined end point.

For example, the predetermined start point and the predetermined end point may be set according to control set in advance executed by the image processing apparatus 11 or another apparatus or may be set according to an instruction of the user. As an example, a point in time when the frame region 1451 is set anew may be set as the predetermined start point or a point in time when the frame region 1451 is changed to another frame region may be set as the predetermined end point. As another example, a point in time designated by the user may be set as the predetermined start point or the predetermined end point. As another example, when the predetermined start point is set according to any one of the methods explained above, the length of a period between the predetermined start point and the predetermined end point may be set in advance or may be set according to an instruction of the user.

Figure 30:
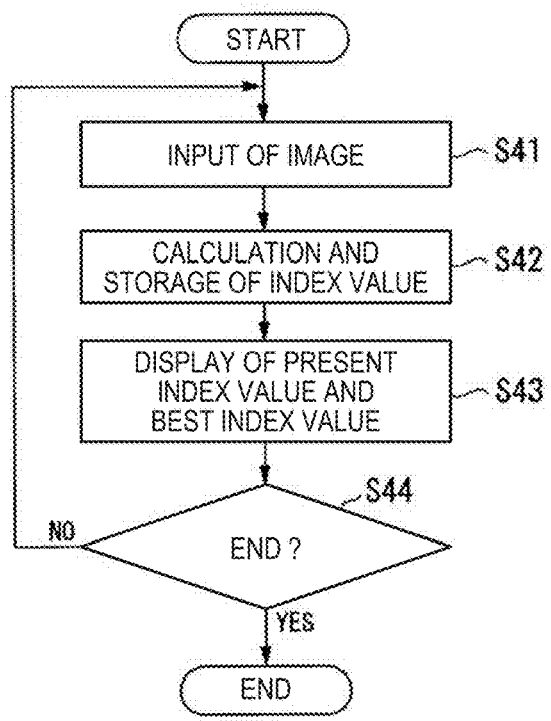
FIG. 30 is a diagram showing an example of a procedure of processing performed by the image processing apparatus when disposition for image pickup is manually adjusted by a user.

FIG. 30 is a diagram showing an example of a procedure of processing performed by the image processing apparatus 11 when the user manually adjusts the disposition for image pickup.

For example, the processing of the flow is performed in a period from a predetermined start point to a predetermined end point.

In the period, the image pickup apparatus 12 receives operation of the user at any timing. Consequently, the disposition for image pickup changes. In this embodiment, as the operation of the user, operation of a focus ring included in the image pickup apparatus 12 is used.

Step S41

In the image processing apparatus 11, information concerning an image picked up by the image pickup apparatus 12 is input to the input section 121.

Step S42

In the image processing apparatus 11, the index-value calculating section 161 calculates an index value of the frame region 1451. The index-value-calculating section 161 or the like stores the index value in the storing section 123. The focusing display section 162 determines and displays presence or absence of focusing concerning the frame region 1451.

Step S43

In the image processing apparatus 11, the best-index-value display section 164 displays a present index value and determines and displays a best index value. Note that the best-index-value display section 164 may store the best index value in the storing section 123.

Step S44

In the image processing apparatus 11, the image-processing control section 124 determines whether to end the processing of the flow.

As a result of the determination, when determining to end the processing of the flow, the image-processing control section 124 ends the processing of the flow (YES in step S44).

On the other hand, as a result of the determination, when determining not to end the processing of the flow, the image-processing control section 124 shifts to processing in step S41 (NO in step S44).

For example, when the predetermined end point comes or when the processing of the flow is suspended according to an instruction of the user or the like, the image-processing control section 124 determines to end the processing of the flow.

As explained above, the image processing apparatus 11 according to this embodiment uses, as an index value of focusing, a value based on edge width less easily affected by a target object, an image of which is picked up, or content of the picked-up image. Consequently, the image processing apparatus 11 according to this embodiment is capable of making full use of an ability of an optical system and performing adjustment of focusing.

The image processing apparatus 11 according to this embodiment determines, concerning one or more frame regions, presence or absence of focusing and displays the presence or absence of focusing on the picked-up image. Consequently, the image processing apparatus 11 according to this embodiment can present presence or absence of focusing to the user in a unit of a frame region. Therefore, the user is capable of accurately performing adjustment of focusing.

As a specific example, the image processing apparatus 11 according to this embodiment is capable of setting a frame region in a part desired to be focused. For example, when only a region of interest of a target object of image processing is focused (a part of a picked-up image is focused), it is possible to improve accuracy of focusing.

The image processing apparatus 11 according to this embodiment determines and displays presence or absence of focusing concerning a plurality of frame regions. Consequently, the image processing apparatus 11 according to this embodiment is capable of determining presence or absence of a tilt of a target object.

For example, in the past, when a certain target object having depth tilts with respect to an image pickup surface, concerning the target object, it is sometimes difficult for the user to manually adjust an iris ring and a focus ring such that portions in two places having a level difference (e.g., two places in the front and the depth) are simultaneously focused. On the other hand, the image processing apparatus 11 according to this embodiment is capable of presenting to the user whether, concerning a target object having depth (having unevenness), all of necessary portions are focused.

The image processing apparatus 11 according to this embodiment determines presence or absence of focusing and displays the presence or absence of focusing on a picked-up image concerning one or more pixels. Consequently, the image processing apparatus 11 according to this embodiment can present the presence or absence of focusing to the user in a unit of a pixel. Therefore, the user is capable of accurately perform adjustment of focusing.

When the adjustment of focusing is performed, the image processing apparatus 11 according to this embodiment displays both of a present index value and a best index value in the past to guide the user. Consequently, with the image processing apparatus 11 according to this embodiment, the user is capable of performing the adjustment of focus while viewing both of the present index value and the best index value.

As an example, the user causes the image processing apparatus 11 to calculate and display an index value while manually turning the focus ring of the image pickup apparatus 12 and causes the image processing apparatus 11 to store a satisfactory index value (e.g., a most satisfactory index value). Then, while manually turning the focus ring of the image pickup apparatus 12, the user turns and adjusts the focus ring to set the index value to the satisfactory index value.

Even when a luminance difference occurs in, for example, a work environment in a line, the image processing apparatus 11 according to this embodiment is capable of accurately performing the adjustment of focusing concerning the entire target object or a part of the target object on the basis of the index value. Consequently, the image processing apparatus 11 according to this embodiment is capable of performing stable highly accurate adjustment of focusing.

For example, when inspection, measurement, or the like of a target object is performed, the image processing apparatus 11 according to this embodiment can focus a desired portion (a part) in an image set as a target of processing. Consequently, it is possible to focus on a target of inspection, measurement, or the like. It is possible to improve accuracy of inspection, measurement, or the like.

As a specific example, when inspection, measurement, or the like is performed concerning only a predetermined region (a ROI) of a target object, the image processing apparatus 11 according to this embodiment can focus on the region. For example, even when there is unevenness on the target object, it is possible to improve accuracy of focusing. Consequently, it is possible to focus on a partial region (the ROI) of the target object. It is possible to improve accuracy of inspection, measurement, or the like. Note that inclination (a tilt) in picking up an image of the target object may be corrected according to necessity.

As explained above, with the image processing apparatus 11 according to this embodiment, it is possible to improve accuracy of focusing of an image.

Third Embodiment

In a third embodiment, the functions of the image processing apparatus 11 according to the second embodiment are applied to a double-arm robot.

Robot

Figure 31:
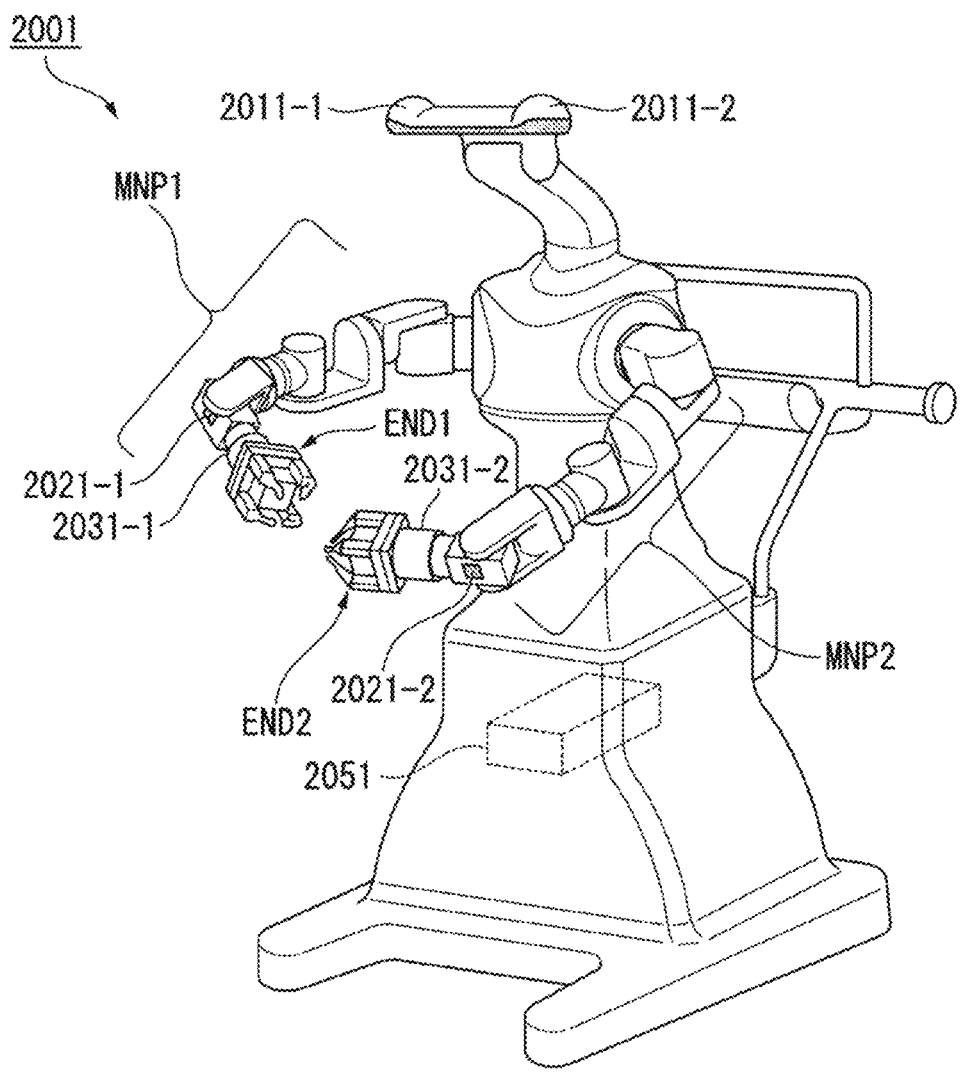
FIG. 31 is a diagram showing a schematic configuration example of a robot according to a third embodiment of the invention.

FIG. 31 is a diagram showing a schematic configuration example of a robot 2001 according to the third embodiment of the invention.

The robot 2001 includes a head section present in an upper part, a body section present in a center part, a base section (a portion of a base) present in a lower part, and arm sections provided in the body section.

The robot 2001 is a double-arm robot including two arms as the arm sections.

The robot 2001 includes, as the configuration on one arm side, a first manipulator MNP1, a first force sensor 2031-1, and a first end effector END1. The first manipulator MNP1, the first force sensor 2031-1, and the first end effector END1 are integrated. In this embodiment, the first force sensor 2031-1 is provided between the first manipulator MNP1 and the first end effector END1.

The robot 2001 includes, as the configuration on the other arm side, a second manipulator MNP2, a second force sensor 2031-2, and a second end effector END2. The second manipulator MNP2, the second force sensor 2031-2, and the second end effector END2 are integrated. In this embodiment, the second force sensor 2031-2 is provided between the second manipulator MNP2 and the second end effector END2.

In this embodiment, it is possible to perform operation of a degree of freedom of seven axes with the configuration on the one arm side (the manipulator MNP1 attached with the end effector END1). It is possible to perform operation at a degree of freedom of seven axes with the configuration on the other arm side (the manipulator MNP2 attached with the end effector END2). However, as another configuration example, a configuration for performing operation at a degree of freedom of six axes or less or eight axes or more may be used.

When the arm operates at a degree of freedom of seven axes, postures that the arm can take increases compared with when the arm operates at a degree of freedom of six axes or less. Therefore, for example, the arm smoothly operates and can easily avoid interference with an object present around the arm. When the arm operates at a degree of freedom of seven axes, the arm is easily controlled with small computational complexity compared with when the arm operates at the degree of freedom of eight axes or more. Therefore, in this embodiment, as a preferred example, the arm operating at a degree freedom of seven axes is used.

In this embodiment, the body section is a portion of the waist and is capable of rotating at a degree of freedom of one axis.

The robot 2001 includes two image pickup sections (a first image pickup section 2011-1 and a second image pickup section 2011-2) respectively provided on the left and the right of the head, an image pickup section (a third image pickup section 2021-1) provided in a predetermined part of the first manipulator MNP1, and an image pickup section (a fourth image pickup section 2021-2) provided in a predetermined part of the second manipulator MNP2.

Each of the image pickup sections (the first image pickup section 2011-1, the second image pickup section 2011-2, the third image pickup section 2021-1, and the fourth image pickup section 2021-2) is a camera including, for example, a CCD (Charge Coupled Device) or a CMOS (Complementary Metal Oxide Semiconductor).

The first image pickup section 2011-1 and the second image pickup section 2011-2 are respectively moved according to movements of the head.

The third image pickup section 2021-1 and the fourth image pickup section 2021-2 are respectively moved according to respective movements of the first manipulator MNP1 and the second manipulator MNP2.

The robot 2001 includes a control apparatus 2051. In this embodiment, the robot 2001 includes the control apparatus 2051 on the inside of the base section.

The control apparatus 2051 controls the operation of the robot 2001. The control apparatus 2051 controls, for example, the operations of the first manipulator MNP1 and the second manipulator MNP2. Further, in a configuration in which a portion such as the waist of the robot 2001 can operate, the control apparatus 2051 controls the operation of the portion such as the waist.

In this embodiment, the first image pickup section 2011-1, the second image pickup section 2011-2, the third image pickup section 2021-1, and the fourth image pickup section 2021-2 respectively pick up images and transmit (output) information concerning the picked-up images to the control apparatus 2051. The first force sensor 2031-1 and the second force sensor 2031-2 respectively detect forces and moments respectively acting on the first end effector END1 and the second end effector END2 and transmit (output) information concerning detection results to the control apparatus 2051. The control apparatus 2051 receives these kinds of information and can use the received information in controlling the operation of the robot 2001.

The first image pickup section 2011-1, the second image pickup section 2011-2, the third image pickup section 2021-1, the fourth image pickup section 2021-2, the first force sensor 2031-1, and the second force sensor 2031-2 are respectively connected to the control apparatus 2051 via lines and capable of communicating information via the lines.

In this embodiment, calibration of a coordinate system is performed concerning the position and the posture of the first manipulator MNP1, the position and the posture of the second manipulator MNP2, and images picked up by the image pickup sections (the first image pickup section 2011-1, the second image pickup section 2011-2, the third image pickup section 2021-1, and the fourth image pickup section 2021-2).

In this embodiment, the control apparatus 2051 controls the operation of the robot 2001 according to an operation control program set in advance. The control apparatus 2051 teaches the robot 2001 (a main body) about various kinds of information necessary for realizing the operation of the robot 2001.

As a specific example, the control apparatus 2051 controls the operations of the manipulators (the first manipulator MNP1 and the second manipulator MNP2) to be capable of, for example, gripping an object with the end effectors (the first end effector END1 and the second end effector END2), moving the object gripped by the end effectors, placing the object gripped by the end effectors in a predetermined position and releasing the object (releasing the gripping), and machining (e.g., boring) the object gripped by the end effectors.

Note that, instead of the double-arm robot including the two arms, the robot may be a single-arm robot including one arm, may be a parallel link robot, may be an orthogonal axis robot, may be a single axis robot, or may be a SCARA robot.

Control Apparatus

Figure 32:
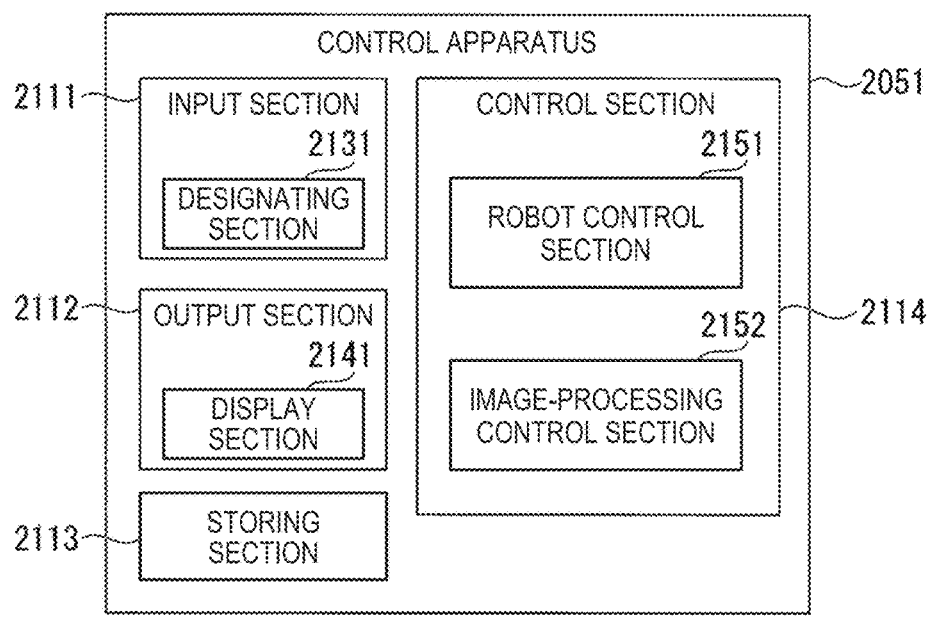
FIG. 32 is a diagram showing a schematic configuration example of a control apparatus according to the third embodiment of the invention.

FIG. 32 is a diagram showing a schematic configuration example of the control apparatus 2051 according to the third embodiment of the invention.

The control apparatus 2051 includes an input section 2111, an output section 2112, a storing section 2113, and a control section 2114. The input section 2111 includes a designating section 2131. The output section 2112 includes a display section 2141. The control section 2114 includes a robot control section 2151 and an image-processing control section 2152.

Information is input to the input section 2111 from the outside. For example, the input section 2111 may include an operation section operated by the user. Information corresponding to the operation of the operation section may be input to the input section 2111 or information output from an external apparatus may be input to the input section 2111. The designating section 2131 has a function of receiving designation.

The output section 2112 outputs information to the outside. For example, the output section 2112 may include a screen (a display screen) and output information to the screen or may output information to the external apparatus. The display section 2141 has a function of displaying information on the screen.

The storing section 2113 stores information. For example, the storing section 2113 stores an operation control program, various parameters, and the like.

The control section 2114 performs various kinds of control concerning the robot 2001. For example, the control section 2114 includes a processor such as a CPU. The control section 2114 executes the operation control program stored in the storing section 2113 to thereby perform the various kinds of control.

The robot control section 2151 performs control concerning the manipulators MNP1 and MNP2, the end effectors END1 and END2, and the like of the robot 2001.

The image-processing control section 2152 performs control concerning image processing.

In this embodiment, the input section 2111 and the designating section 2131, the output section 2112 and the display section 2141, the storing section 2113, and the image-processing control section 2152 respectively have, concerning image processing, for example, functions same as the functions of the input section 121 and the designating section 141, the output section 122 and the display section 151, the storing section 123, and the image-processing control section 124 shown in FIG. 13 according to the second embodiment. In this embodiment, one (or two or more) of the four image pickup sections 2011-1, 2011-2, 2021-1, and 2021-2 corresponds to the image pickup apparatus 12 shown in FIG. 13 according to the second embodiment. Note that, in this embodiment, functions of focus rings of the image pickup sections (one or more of the image pickup sections 2011-1, 2011-2, 2021-1, and 2021-2) may be included in the input section 121 or the like.

The robot control section 2151 may perform control concerning the robot 2001 on the basis of a result of image processing obtained by the image-processing control section 2152.

As explained above, the robot 2001 according to this embodiment has the function of the image processing apparatus including the image-processing control section 2152 and can obtain effects same as the effects in the second embodiment.

Fourth Embodiment

Figure 33:
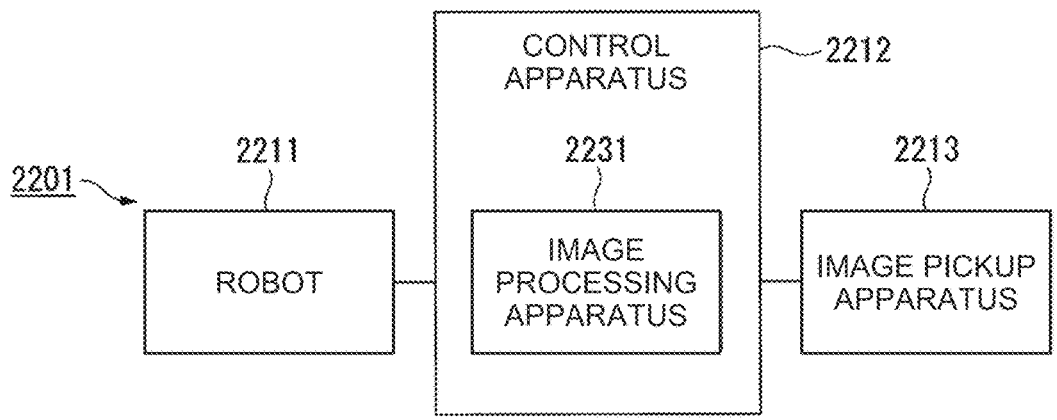
FIG. 33 is a diagram showing a schematic configuration example of a robot system according to a fourth embodiment of the invention.

FIG. 33 is a diagram showing a schematic configuration example of a robot system 2201 according to a fourth embodiment of the invention.

The robot system 2201 includes a robot 2211, a control apparatus 2212, and an image pickup apparatus 2213. The control apparatus 2212 includes an image processing apparatus 2231.

The robot 2211 and the control apparatus 2212 are communicably connected. The control apparatus 2212 and the image pickup apparatus 2213 are communicably connected.

In this embodiment, the image processing apparatus 2231 has, for example, a function same as the function of the image processing apparatus 11 shown in FIG. 13 according to the second embodiment. In this embodiment, the image pickup device 2213 corresponds to the image pickup apparatus 12 shown in FIG. 13 according to the second embodiment.

The control apparatus 2212 has a function of performing control concerning the robot 2211. The control apparatus 2212 may perform the control concerning the robot 2211 on the basis of a result of image processing obtained by the image processing apparatus 2231.

Note that, in this embodiment, the robot 2211 and the image pickup apparatus 2213 are provided as separate bodies.

As the robot 2211, various robots may be used.

As explained above, the robot system 2201 according to this embodiment includes the image processing apparatus 2231 and can obtain effects same as the effects in the second embodiment and the third embodiment.

Outline of the Embodiments

As a configuration example, an image processing apparatus (in the example shown in FIG. 13, the image processing apparatus 11) that changes the position of a lens included in an image pickup apparatus (in the example shown in FIG. 13, the image pickup apparatus 12) and thereafter displays first information (in the example shown in FIG. 29, the information concerning the best index value) for determining whether a part of or an entire image picked up by the image pickup apparatus is focused and second information concerning focusing in the position of the lens (in the example shown in FIG. 29, the information concerning the present index value).

As a configuration example, the image processing apparatus includes a designating section (in the example shown in FIG. 13, the designating section 141) that designates a part of the image.

As a configuration example, in the image processing apparatus, apart of the image is a unit of a region of interest (ROI) (e.g., the example shown in FIG. 22) or a unit of a pixel (e.g., the example shown in FIGS. 26 to 28).

As a configuration example, in the image processing apparatus, the first information and the second information are index values.

As a configuration example, in the image processing apparatus, the first information is an index value representing a highest degree of focusing (the example shown in FIG. 29).

As a configuration example, the image processing apparatus includes a focusing display section (in the example shown in FIG. 13, the focusing display section 162) that displays one or both of presence and absence of focusing on the basis of an index value concerning a part of the image.

As a configuration example, the image processing apparatus includes a tilt determining section (in the example shown in FIG. 13, the tilt determining section 163) that, when there are a plurality of the parts of the image and all of the plurality of parts of the image are focused, determines that there is no tilt concerning a target object specified by apart of the plurality of images and, on the other hand, when one or more of the plurality of parts of the image are not focused, determines that there is a tilt concerning the target object (the example shown in FIG. 22).

As an example, the image processing apparatus includes an index-value calculating section (in the example shown in FIG. 13, the index-value calculating section 161) that extracts a contour of an object using the image and calculates the index value (the example shown in FIGS. 14 to 20).

As a configuration example, in the image processing apparatus, the index value is a value based on length in a gradient direction of luminance of the contour (the example shown in FIGS. 14 to 20).

As a configuration example, in the image processing apparatus, the index value is a value based on width of an edge of luminance of the contour (the example shown in FIGS. 14 to 20).

As a configuration example, in the image processing apparatus, the index value is a value based on edge width of a connected plurality of very small luminance gradients of the contour (another example concerning FIGS. 14 to 20).

As a configuration example, a robot (in the example shown in FIGS. 31 and 32, the robot 2001) includes the image processing apparatus explained above (in the example shown in FIGS. 31 and 32, the apparatus of the functional portion of the image-processing control section 2152).

As a configuration example, a robot system (in the example shown in FIG. 33, the robot system 2201) includes the image processing apparatus explained above (in the example shown in FIG. 33, the image processing apparatus 2231), an image pickup apparatus (in the example shown in FIG. 33, the image pickup apparatus 2213) that picks up an image, and a robot (in the example shown in FIG. 33, the robot 2211).

The embodiment of the invention is explained in detail above with reference to the drawings. However, a specific configuration is not limited to the embodiment. The embodiment may be, for example, changed, substituted, or deleted without departing from the spirit of the invention. Design and the like not departing from the spirit of the invention are also included in the embodiment.

A computer program for realizing functions of any components in the apparatuses explained above (e.g., the image processing apparatus 20, the robot control apparatus 60 of the robot 50, the image processing apparatuses 11 and 2231, and the control apparatuses 2051 and 2212) may be recorded in a computer-readable recording medium. The computer program may be executed by causing a computer system to read the computer program.

Note that the "computer system" includes an OS (Operating System) and hardware such as peripheral apparatuses. The "computer-readable recording medium" refers to a portable medium such as a flexible disk, a magneto-optical disk, a ROM (Read Only Memory), or a CD (Compact Disk)-ROM or a storage device such as a hard disk incorporated in the computer system. Further, the "computer-readable recording medium" includes a recording medium that retains the computer program for a fixed time like a volatile memory (a RAM: Random Access Memory) inside the computer system functioning as a server or a client when the computer program is transmitted via a network such as the Internet or a communication line such as a telephone line.

The computer program may be transmitted from a computer system that stores the computer program in a storage device or the like to another computer system via a transmission medium or a transmission wave in the transmission medium. The "transmission medium" for transmitting the computer program refers to a medium having a function of transmitting information like a network (a communication network) such as the Internet or a communication line (a communication wire) such as a telephone line.

The computer program may be a computer program for realizing a part of the functions explained above. Further the computer program may be a computer program that can realize the functions in combination with a computer program already recorded in the computer system, a so-called differential file (a differential program).

The entire disclosure of Japanese Patent Application Nos. 2015-221880, filed Nov. 12, 2015 and 2015-221881, filed Nov. 12, 2015 are expressly incorporated by reference herein.

What is claimed is:

1. An image processing apparatus that performs inspection or measurement of an object in a region surrounding the object that is included in an image, the image processing apparatus comprising:
   an imaging device that is configured to generate the image; and
   a controller in communication with the imaging device,
   wherein the controller is configured to conduct first image processing based on receipt of an input from a user, the input being directed to at least one selected from the group consisting of analyzing the image for geometric characteristics of the object, analyzing the image for straight lines within the region, analyzing the image for inter-straight-line distance calculation, analyzing the image for color inspection, and analyzing the image for inter-two-point-straight-line crossing point detection; and
   based on the input selected by the user, the controller is configured to conduct second image processing by further analyzing the image for at least one selected from the group consisting of gap measurement, object color inspection, inter-two-object distance calculation, and square center detection.

2. The image processing apparatus according to claim 1, further comprising a display section, the display section including icons for the user to select at least one of the gap measurement, the object color inspection, the inter-two-object distance calculation, and the square center detection.

3. The image processing apparatus according to claim 1, wherein the image processing apparatus is configured to perform editing of the image based on the first image processing and the second image processing.

4. The image processing apparatus according to claim 3, wherein the controller is configured for receipt of parameters input by the user to execute the first image processing.

5. A robot system comprising:
   the image processing apparatus according to claim 1; and
   a robot configured to perform predetermined work on the basis of a result of image processing by the image processing apparatus.

6. A robot system comprising:
   the image processing apparatus according to claim 2; and
   a robot configured to perform predetermined work on the basis of a result of image processing by the image processing apparatus.

7. A robot system comprising:
   the image processing apparatus according to claim 3; and
   a robot configured to perform predetermined work on the basis of a result of image processing by the image processing apparatus.

8. A robot system comprising:
   the image processing apparatus according to claim 4; and
   a robot configured to perform predetermined work on the basis of a result of image processing by the image processing apparatus.

9. A robot comprising the image processing apparatus according to claim 1.

10. A robot comprising the image processing apparatus according to claim 2.

11. A robot comprising the image processing apparatus according to claim 3.

12. A robot comprising the image processing apparatus according to claim 4.

* * * * *